US010368169B1

(12) United States Patent
Linsky et al.

(10) Patent No.: US 10,368,169 B1
(45) Date of Patent: Jul. 30, 2019

(54) POWER AND BANDWIDTH EFFICIENT TRUE WIRELESS STEREO SPEAKERS

(71) Applicant: QUALCOMM Incorporated, San Diego, CA (US)

(72) Inventors: Joel Linsky, San Diego, CA (US); Dishant Srivastava, Bangalore (IN); Neil Stewart, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/102,450

(22) Filed: Aug. 13, 2018

(51) Int. Cl.
H04R 27/00 (2006.01)
H04B 5/00 (2006.01)
H04R 5/00 (2006.01)
H04R 3/12 (2006.01)
H04R 5/04 (2006.01)

(52) U.S. Cl.
CPC ............... H04R 3/12 (2013.01); H04R 5/04 (2013.01); *H04R 2420/07* (2013.01)

(58) Field of Classification Search
CPC ... H04R 3/00; H04R 3/12; H04R 5/02; H04R 5/04; H04R 2420/00; H04R 2420/03; H04R 2420/05; H04R 2420/07; H04R 2420/09; H04R 27/00; H04R 2227/005; H04B 5/00; H04B 5/0006; H04H 20/83; H04W 4/06; H04W 4/80
See application file for complete search history.

(56) References Cited

U.S. PATENT DOCUMENTS

| 8,068,925 | B2 * | 11/2011 | McKillop | G06F 3/165 381/77 |
|---|---|---|---|---|
| 2007/0223725 | A1 * | 9/2007 | Neumann | H04R 5/04 381/80 |
| 2008/0070516 | A1 * | 3/2008 | Lee | H04R 5/04 455/90.1 |
| 2008/0092204 | A1 * | 4/2008 | Bryce | H04N 7/163 725/143 |
| 2008/0168312 | A1 * | 7/2008 | Banks | H04L 1/0015 714/39 |
| 2016/0309269 | A1 * | 10/2016 | Peters | H04B 1/20 |
| 2017/0272860 | A1 * | 9/2017 | Jeanne | H04R 3/12 |
| 2018/0060021 | A1 * | 3/2018 | Hostage | H04L 65/1069 |

* cited by examiner

*Primary Examiner* — Thang V Tran
(74) *Attorney, Agent, or Firm* — Holland & Hart LLP/Qualcomm

(57) ABSTRACT

Methods, systems, and devices for wireless communications are described. Generally the described techniques provide for establishing, by a first speaker a control communication link with a second speaker over a first piconet, receiving a signal during an extended synchronous connection-oriented (eSCO) window between a wireless device and the second speaker (e.g., one of a null signal, an acknowledgement (ACK) signal, or a negative acknowledgement (NACK) signal) switching from the second piconet to the first piconet based on the received communication, communicating with the second speaker on the first piconet, and closing the eSCO window based at least in part on the communication.

20 Claims, 12 Drawing Sheets

POWER AND BANDWIDTH EFFICIENT TRUE WIRELESS STEREO SPEAKERS

BACKGROUND

The following relates generally to wireless communications, and more specifically to power and bandwidth efficient true wireless stereo speakers.

Wireless communications systems are widely deployed to provide various types of communication content such as voice, video, packet data, messaging, broadcast, and so on. In a wireless communication system, such as a Bluetooth system, devices may communicate on at low power over short distances. In some examples, Bluetooth devices may utilize channels within the frequency band via spread-spectrum frequency hopping. In some examples, two or more devices communicating via Bluetooth protocols may communicate on an ad hoc network referred to as a piconet. Each piconet may include a master device and one or more slave devices. Timing information regarding the piconet may be determined based on the master device. In some examples, the master device may transmit in a first transmission time interval (TTI) (e.g., a first Bluetooth slot of a Bluetooth slot pair) and may receive transmissions from one or more slave devices of the piconet in a second TTI (e.g., a second Bluetooth slot of Bluetooth slot pair).

In some cases, Bluetooth devices may include, for example, a device such as a cell phone, smart phone, portable music player, or the like. Such a device may be in communication with one or more speakers (e.g., true wireless stereo (TWS) Bluetooth ear buds). A speaker, such as an ear bud (e.g., a primary ear bud), may be connected to the phone and may pass the information (e.g., timing information) of the piconet where the phone is the master device to the second ear bud (e.g., a secondary bud or sniffer bud). The secondary ear bud may sniff voice data between the primary ear bud and the phone. However, both the primary and the secondary ear buds may be subject to packet errors while receiving the data. Upon the closing of each enhanced synchronous connection oriented (eSCO) window, the primary earbud and the secondary earbud may cooperate with each other to retrieve any lost or unreceived data. This may be referred to as selective relay. Each eSCO window may include a transmission period and a retransmission period. In some cases, transmission or retransmission may be successfully completed, but ear buds may be configured to wait for the conclusion of the retransmission window of the eSCO window before implementing selective relay. Waiting to implement selective relay until after the close of an eSCO window may result in additional air time and excessive power expenditure.

SUMMARY

The described techniques relate to improved methods, systems, devices, and apparatuses that support power and bandwidth efficient true wireless stereo speakers. Generally, the described techniques provide for establishing a control communication link with a second speaker over a first piconet, receiving, in a first slot of an extended synchronous connection-oriented (eSCO) window on a second piconet, a first null signal sent from a wireless device to the second speaker; switching, in a second slot of the eSCO window that is consecutive to the first slot, and based at least in part on the first null signal, from the second piconet to the first piconet; transmitting to the second speaker, on the first piconet, a second null signal based at least in part on the first null signal; and closing the eSCO window based at least in part on the second null signal. In some examples, the described techniques provide for establishing a control communication link with a second speaker over a first piconet; receiving, in a first slot of an eSCO window on a second piconet, an acknowledgment (ACK) signal or a negative acknowledgement (NACK) signal sent from the second speaker to the wireless device; switching, in a second slot of the eSCO window and based at least in part on the received ACK signal or NACK signal, from the second piconet to the first piconet; communicating with the second speaker on the first piconet based at least in part on the received ACK signal or NACK signal; and closing the eSCO window based at least in part on the communicating.

A method of wireless communication at a first speaker is described. The method may include establishing a control communication link with a second speaker over a first piconet, receiving, in a first slot of an eSCO window on a second piconet, a first null signal sent from a wireless device to the second speaker, switching, in a second slot of the eSCO window that is consecutive to the first slot, and based on the first null signal, from the second piconet to the first piconet, transmitting to the second speaker, on the first piconet, a second null signal based on the first null signal, and closing the eSCO window based on the second null signal.

An apparatus for wireless communication at a first speaker is described. The apparatus may include a processor, memory in electronic communication with the processor, and instructions stored in the memory. The instructions may be executable by the processor to cause the apparatus to establish a control communication link with a second speaker over a first piconet, receive, in a first slot of an eSCO window on a second piconet, a first null signal sent from a wireless device to the second speaker, switch, in a second slot of the eSCO window that is consecutive to the first slot, and based on the first null signal, from the second piconet to the first piconet, transmit to the second speaker, on the first piconet, a second null signal based on the first null signal, and close the eSCO window based on the second null signal.

Another apparatus for wireless communication at a first speaker is described. The apparatus may include means for establishing a control communication link with a second speaker over a first piconet, receiving, in a first slot of an extended synchronous connection-oriented (eSCO) window on a second piconet, a first null signal sent from a wireless device to the second speaker, switching, in a second slot of the eSCO window that is consecutive to the first slot, and based on the first null signal, from the second piconet to the first piconet, transmitting to the second speaker, on the first piconet, a second null signal based on the first null signal, and closing the eSCO window based on the second null signal.

A non-transitory computer-readable medium storing code for wireless communication at a first speaker is described. The code may include instructions executable by a processor to establish a control communication link with a second speaker over a first piconet, receive, in a first slot of an eSCO window on a second piconet, a first null signal sent from a wireless device to the second speaker, switch, in a second slot of the eSCO window that is consecutive to the first slot, and based on the first null signal, from the second piconet to the first piconet, transmit to the second speaker, on the first piconet, a second null signal based on the first null signal, and close the eSCO window based on the second null signal.

Some examples of the method, apparatuses, and non-transitory computer-readable medium described herein may further include operations, features, means, or instructions for receiving, on the second piconet, a data transmission sent from the wireless device to the second speaker, receiving, on the second piconet, an ACK signal sent from the second speaker to the wireless device, the ACK signal corresponding to the received data transmission and receiving, on the second piconet, the first null signal sent from the wireless device to the second speaker, where the first null signal may be a null ACK signal that may be based on the received ACK signal.

In some examples of the method, apparatuses, and non-transitory computer-readable medium described herein, transmitting the second null signal further may include operations, features, means, or instructions for transmitting to the second speaker, on the first piconet, the second null signal in the second slot based on the received data transmission sent from the wireless device to the second speaker and the received ACK signal sent from the second speaker to the wireless device.

Some examples of the method, apparatuses, and non-transitory computer-readable medium described herein may further include operations, features, means, or instructions for failing to receive, on the second piconet, a data transmission sent from the wireless device to the second speaker, receiving, on the second piconet, an ACK signal sent from the second speaker to the wireless device based on the received data transmission and receiving, on the second piconet, the first null signal sent from the wireless device to the second speaker, where the first null signal may be a null ACK signal corresponding to the received ACK signal.

In some examples of the method, apparatuses, and non-transitory computer-readable medium described herein, transmitting the second null signal further may include operations, features, means, or instructions for transmitting to the second speaker, on the first piconet, a poll signal requesting the data transmission sent from the wireless device to the second speaker, receiving from the second speaker, on the first piconet and based on the poll signal, the data transmission and transmitting to the second speaker, on the first piconet and based on receiving the data transmission, the second null signal, where the null signal may be a null ACK signal corresponding to the received data transmission.

In some examples of the method, apparatuses, and non-transitory computer-readable medium described herein, the first slot may be a first slot of a first Bluetooth slot pair corresponding to the second piconet, and the second slot may be a first slot of a second Bluetooth slot pair corresponding to the first piconet.

Some examples of the method, apparatuses, and non-transitory computer-readable medium described herein may further include operations, features, means, or instructions for determining, based on receiving the first null signal, that the wireless device will not send more transmissions to the second speaker for the duration of the eSCO window and switching to the first piconet based on the determining.

In some examples of the method, apparatuses, and non-transitory computer-readable medium described herein, establishing the control communication link further may include operations, features, means, or instructions for receiving, from the second speaker, information about the second piconet information.

Some examples of the method, apparatuses, and non-transitory computer-readable medium described herein may further include operations, features, means, or instructions for performing sniffing procedures to detect signaling between the wireless device and the second speaker on the second piconet based on the received information about the second piconet.

In some examples of the method, apparatuses, and non-transitory computer-readable medium described herein, the first speaker may be a master device and the second speaker may be a slave device with respect to the first piconet, and where the wireless device may be a master device and the second speaker may be a slave device with respect to the second piconet.

A method of wireless communication at a first speaker is described. The method may include establishing a control communication link with a second speaker over a first piconet, receiving, in a first slot of an eSCO window on a second piconet, an ACK signal or a NACK signal sent from the second speaker to a wireless device, switching, in a second slot of the eSCO window and based on the received ACK signal or NACK signal, from the second piconet to the first piconet, communicating with the second speaker on the first piconet based on the received ACK signal or NACK signal, and closing the eSCO window based on the communicating.

An apparatus for wireless communication at a first speaker is described. The apparatus may include a processor, memory in electronic communication with the processor, and instructions stored in the memory. The instructions may be executable by the processor to cause the apparatus to establish a control communication link with a second speaker over a first piconet, receive, in a first slot of an eSCO window on a second piconet, an ACK signal or a NACK signal sent from the second speaker to a wireless device, switch, in a second slot of the eSCO window and based on the received ACK signal or NACK signal, from the second piconet to the first piconet, communicate with the second speaker on the first piconet based on the received ACK signal or NACK signal, and close the eSCO window based on the communicating.

Another apparatus for wireless communication at a first speaker is described. The apparatus may include means for establishing a control communication link with a second speaker over a first piconet, receiving, in a first slot of an eSCO window on a second piconet, an ACK signal or a NACK signal sent from the second speaker to a wireless device, switching, in a second slot of the eSCO window and based on the received ACK signal or NACK signal, from the second piconet to the first piconet, communicating with the second speaker on the first piconet based on the received ACK signal or NACK signal, and closing the eSCO window based on the communicating.

A non-transitory computer-readable medium storing code for wireless communication at a first speaker is described. The code may include instructions executable by a processor to establish a control communication link with a second speaker over a first piconet, receive, in a first slot of an eSCO window on a second piconet, an ACK signal or a NACK signal sent from the second speaker to a wireless device, switch, in a second slot of the eSCO window and based on the received ACK signal or NACK signal, from the second piconet to the first piconet, communicate with the second speaker on the first piconet based on the received ACK signal or NACK signal, and close the eSCO window based on the communicating.

Some examples of the method, apparatuses, and non-transitory computer-readable medium described herein may further include operations, features, means, or instructions for receiving, on the second piconet, a data transmission sent from the wireless device to the second speaker, receiving, on the second piconet, a NACK signal sent from the second speaker to the wireless device, the NACK signal indicating that the second speaker did not successfully receive the data transmission, receiving, on the second piconet, a retransmission of the data transmissions sent from the wireless device to the second speaker based at least in part of the NACK signal and receiving, on the second piconet, an ACK signal sent from the second speaker to the wireless device, the ACK signal indicating that the second speaker successfully received the retransmission of the data transmission.

In some examples of the method, apparatuses, and non-transitory computer-readable medium described herein, communicating with the second speaker on the first piconet further may include operations, features, means, or instructions for transmitting to the second speaker, on the first piconet, a null signal, based on the received ACK signal sent from the second speaker to the wireless device.

Some examples of the method, apparatuses, and non-transitory computer-readable medium described herein may further include operations, features, means, or instructions for receiving, on the second piconet, a data transmission sent from the wireless device to the second speaker, receiving, on the second piconet, a first NACK signal sent from the second speaker to the wireless device, the first NACK signal indicating that the second speaker did not successfully receive the data transmission, receiving, on the second piconet, a retransmission of the data transmissions sent from the wireless device to the second speaker based at least in part of the first NACK signal and receiving, on the second piconet, a second NACK signal sent from the second speaker to the wireless device, the second NACK signal indicating that the second speaker did not successfully received the retransmission of the data transmission.

In some examples of the method, apparatuses, and non-transitory computer-readable medium described herein, communicating with the second speaker on the first piconet further may include operations, features, means, or instructions for transmitting to the second speaker, on the first piconet, a retransmission of received data transmission and receiving from the second speaker, on the first piconet a null ACK signal corresponding to the retransmission of the received data transmission.

In some examples of the method, apparatuses, and non-transitory computer-readable medium described herein, the first slot may be a last slot in a retransmission window of the eSCO window, and the second slot may be a first slot in a cooperation window of the eSCO window.

Some examples of the method, apparatuses, and non-transitory computer-readable medium described herein may further include operations, features, means, or instructions for determining, based on receiving the ACK signal or NACK signal, that the wireless device will not send more transmissions to the second speaker for the duration of the eSCO window and switching to the first piconet based on the determining.

In some examples of the method, apparatuses, and non-transitory computer-readable medium described herein, establishing the control communication link further may include operations, features, means, or instructions for receiving, from the second speaker, information about the second piconet.

Some examples of the method, apparatuses, and non-transitory computer-readable medium described herein may further include operations, features, means, or instructions for performing sniffing procedures to detect signaling between the wireless device and the second speaker on the second piconet based on the received information about the second piconet.

DETAILED DESCRIPTION

Figure 1A:
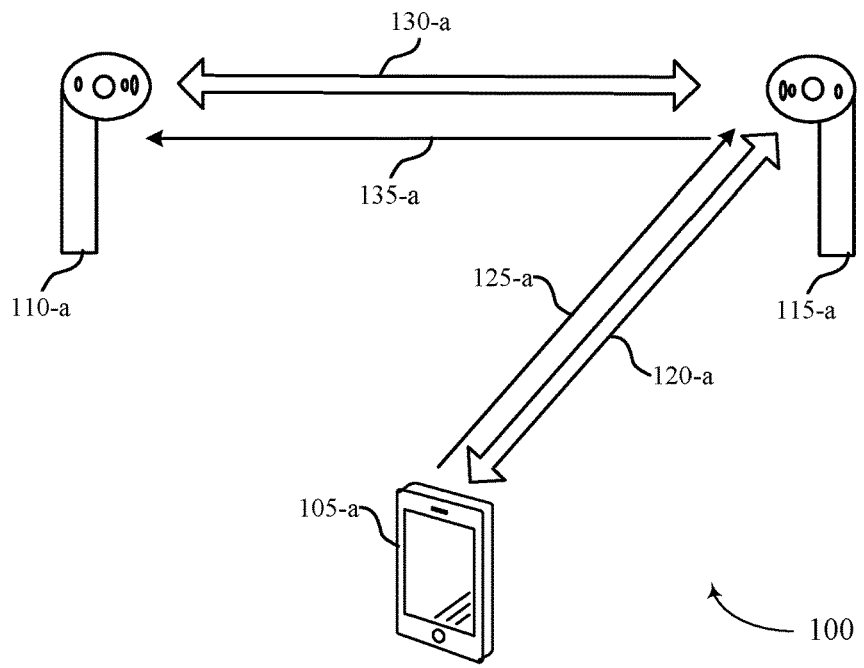
FIGS. 1A and 1B illustrates an example of a wireless communications system that supports power and bandwidth efficient true wireless stereo speakers in accordance with aspects of the present disclosure.

In some cases, Bluetooth devices may include, for example, a wireless device such as a cell phone, smart phone, portable music player, or the like. Such a wireless device may be in communication with one or more speakers (e.g., true wireless stereo (TWS) Bluetooth ear buds). A first speaker, such as an ear bud, may be connected to a second speaker or may be connected to the wireless device. In some examples, the wireless device may be a master device, and may communicate with the second speaker. In some cases, the first speaker may receive information (e.g., timing information) about the piconet on which the wireless device is a master device, from the second speaker. The first speaker may utilize the information to receive voice data transmitted between the wireless device and the phone (e.g., the first device may utilize Bluetooth sniffer procedures to detect and receive voice data transmissions from the wireless device to the second speaker). However, both the first speaker and the second speaker may be subject to packet errors while receiving the data. Upon the closing of each enhanced synchronous connection oriented (eSCO) window, the first speaker and the second speaker may cooperate with each other to retrieve any lost or unreceived data. This may be referred to as selective relay. Each eSCO window may include, for example, a transmission period and a retransmission period. In some cases, transmission or retransmission may be successfully completed, but the first speaker and the second speaker may be configured to wait for the conclusion of a final retransmission window of the eSCO window before implementing selective relay. Waiting to implement selective relay until after the close of an eSCO window may result in excessive power expenditure and bandwidth use.

In some examples, the first speaker and the second speaker may establish a control communication link, and may communicate on a first piconet. The first speaker may assume the role of master device with respect to the first piconet. The wireless device may communicate with the second speaker on a second piconet, and the wireless device may be the master device of the second piconet. In some examples, the first speaker may receive information about the second piconet form the second speaker, and may monitor communications between the wireless device and the first speaker. The first speaker may monitor for and receive voice data from the wireless device to the first speaker, and may also monitor for and receive acknowledgement (ACK) signals or negative acknowledgement (NACK) signals, or null signals. The first speaker may utilize one or more of these received signals to determine that communications from a wireless device for an eSCO window are complete, and may initiate selective relay, regardless of whether transmission or retransmission periods of the eSCO window are complete. The first speaker, acting as master on the first piconet, may shorten the required transmissions of a cooperation window based on information gained from monitoring the data transmissions and the ACK/NACK signals. The Bluetooth devices may thus close eSCO windows without unnecessary waiting or signaling, and may enter idle or sleep modes faster, resulting in increased power and bandwidth efficiency in a wireless communication system.

Aspects of the disclosure are initially described in the context of a wireless communications system. Aspects of the disclosure are further illustrated by and described with reference to timelines. Aspects of the disclosure are further illustrated by and described with reference to apparatus diagrams, system diagrams, and flowcharts that relate to power and bandwidth efficient true wireless stereo speakers.

Figure 1B:
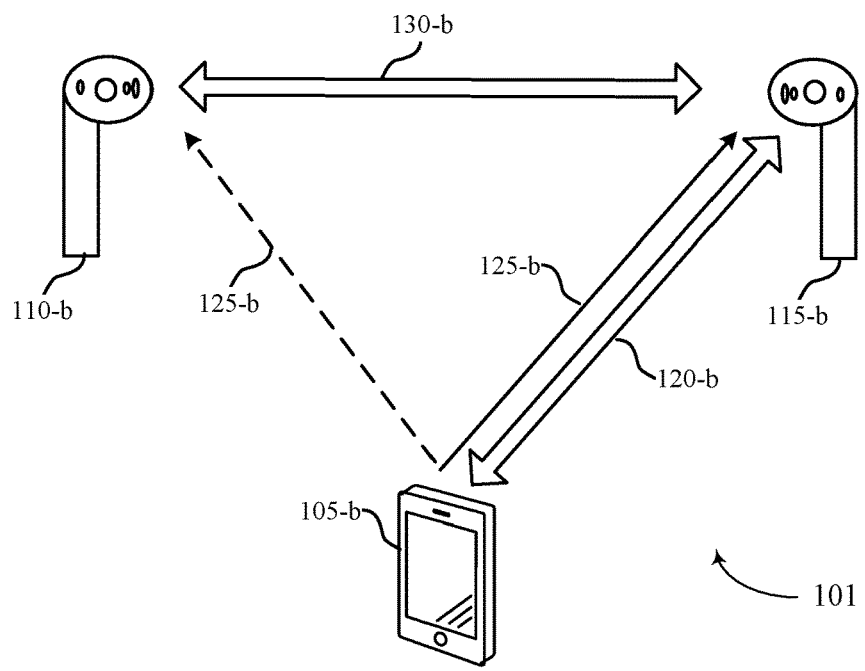

FIGS. 1A and 1B illustrate an examples of a wireless communications system 101 and wireless communications system 102 that supports power and bandwidth efficient true wireless stereo speakers in accordance with aspects of the present disclosure.

In some examples, such as FIG. 1A of a wireless communications system 101 with a first topology may include a wireless device 105-*a*. Wireless device 105-*a* may be, for example, a smart phone, a portable music playing device, or the like. Wireless device 105-*a* may be in communication via bidirectional primary communication link 120-*a* with one or more speakers, such as first speaker 110-*a* or second speaker 115-*a*. Primary communication link 120-*a* may include, for example, control information. In some examples, wireless device 105-*a* may transmit voice data to second speaker 115-*a*. Wireless device 105-*a* may transmit voice data 125-*a* over a separate voice link.

In some examples, second speaker 115-*a* may establish a control link 130-*a* with first speaker 110-*a*. Second speaker 115-*a* may also transmit voice data 135-*a* to first speaker 110-*a* on a separate voice link. However, receiving voice data 125-*a* on a separate voice link, and then relaying the received voice data by transmitting voice data 135-*a* to first speaker 110-*a* on a second separate voice link may unnecessarily utilize extra bandwidth.

In some examples, as shown in FIG. 1B, a wireless communications system 101 with a second topology may include a wireless device 105-*b*, a first speaker 110-*b*, and a second speaker 115-*b*. In some examples, wireless device 105-*b* may communicate with second speaker 115-*b* via a primary communication link 120-*b*. In some examples, wireless device 105-*b* may transmit voice data 125-*b* to second speaker 115-*b*. In some examples, first speaker 110-*b* may establish a control link 130-*b* with second speaker 115-*b*. First speaker 110-*b* and second speaker 115-*b* may communicate on a first piconet via control link 130-*b*. In some examples, wireless device 105-*b* may be a master device on a second piconet, and wireless device 105-*b* and second speaker 115-*b* may communicate on the second piconet.

In some examples, second speaker 115-*b* may provide first speaker 115-*b* with information about the second piconet (e.g., timing information for transmissions on the second piconet). First speaker 110-*b* may perform Bluetooth sniffing procedures based on the information about the second piconet, and may receive voice data 125-*b* that is sent from wireless device 105-*b* to second speaker 115-*b*.

In the first topology of FIG. 1A and the second topology of FIG. 1B, one or both of first speaker 110 or second speaker 115 may be subject to packet failures, and may fail to successfully receive voice data (e.g., voice data 125-*a*, voice data 125-*b*, or voice data 135-*a*). In such examples, first speaker 110 and second speaker 115 may cooperate with each other to ensure that all voice data is successfully received by both first speaker 110 and second speaker 115, which may be referred to as selective relay. Selective relay may utilize additional air time and power consumption. However, first speaker 110 and second speaker 115 may wait for at least one transmission period and at least one retransmission period of an eSCO window before initiation selective relay. Waiting for the full transmission and retransmission period may, in some cases, unnecessarily expend additional power and use additional bandwidth, as shown in more detail with respect to FIG. 2.

Figure 2:
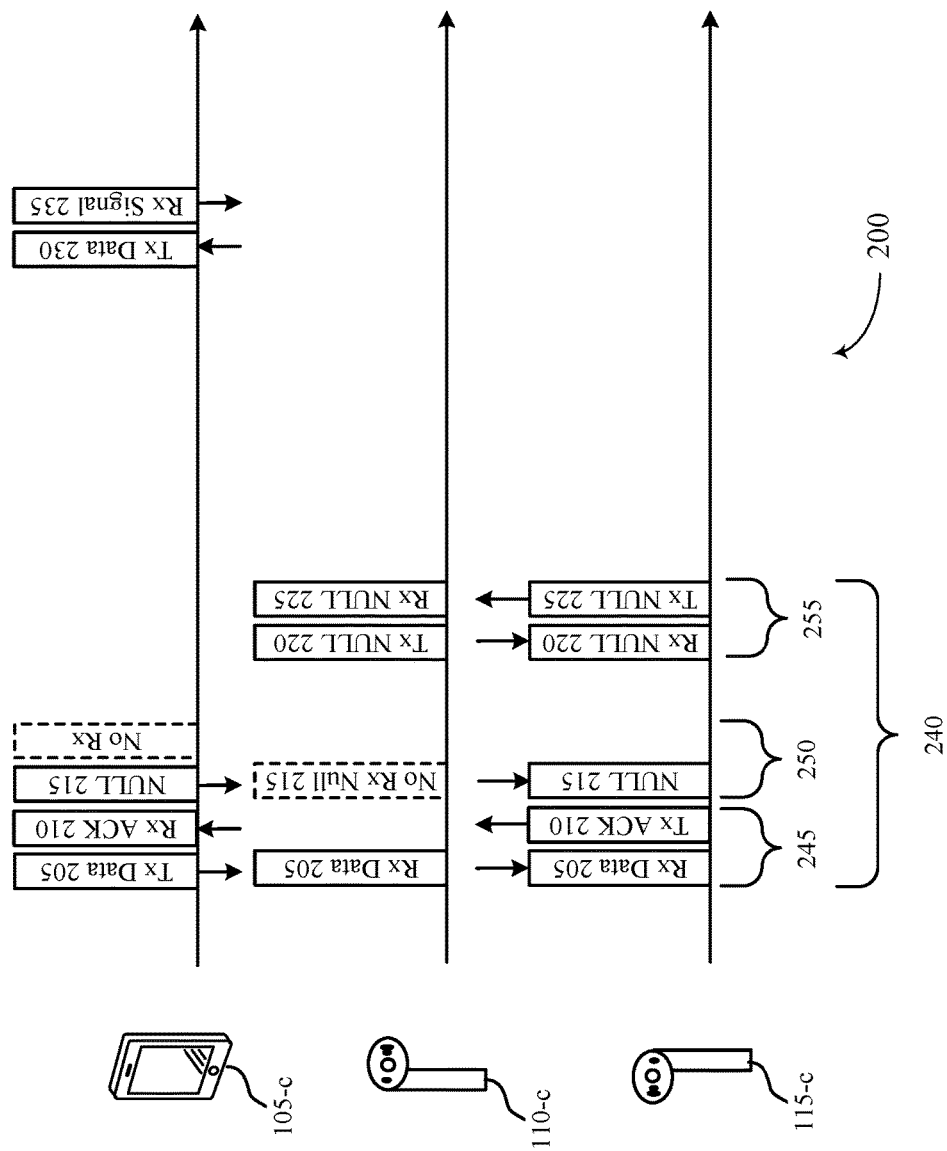
FIG. 2 illustrates an example of a timeline that supports power and bandwidth efficient true wireless stereo speakers in accordance with aspects of the present disclosure.

FIG. 2 illustrates an example of a timeline 200 that supports power and bandwidth efficient true wireless stereo speakers in accordance with aspects of the present disclosure. In some examples, timeline 200 may implement aspects of wireless communications system 100 or wireless communications system 101. For example, wireless device 105-*c*, first speaker 110-*c*, and second speaker 110-*c* may be examples of corresponding devices in wireless communications systems 100 and 101.

In some examples, first speaker 110-*c* may establish a control channel with second speaker 115-*c*, and first speaker 110-*c* and second speaker 115-*c* may communicate on a first piconet. In some examples, first speaker 110-*c* may be the master device with respect to the first piconet. In some examples, wireless device 105-*c* may communicate with second speaker 115-*c* on a second piconet, and wireless device 105-*c* may be the master device with respect to the second piconet. Second speaker 115-*c* may provide information about the second piconet to first speaker 110-*c*, and first speaker 110-*c* may monitor (e.g., sniff) communications between wireless device 105-*c* and second speaker 115-*c* on the second piconet, based on the received information about the second piconet.

In some examples, devices in a wireless communication system may communicate during an eSCO window 240. ESCO window 240 may be closed when both first speaker 110-*c* and second speaker 115-*c* have successfully received at least one transmissions of data 205. ESCO window 240 may include a transmission window 245, which may include a first and second Bluetooth slot (e.g., a first Bluetooth slot for transmission from master wireless device 105-*c* to a slave device such as second speaker 115-c, and a second Bluetooth slot for receiving an ACK signal or a NACK signal from a slave device such as second speaker 115-c). ESCO window 240 may also include a retransmission window 250, which may include one or more Bluetooth slot pairs (e.g., a first Bluetooth slot for retransmitting data 205 to second speaker 115-c, and a second Bluetooth slot for receiving an ACK signal or a NACK signal form second speaker 115-c). In some examples, retransmission window 250 may include multiple Bluetooth slot pairs (e.g., two Bluetooth slot pairs and may include a total of four Bluetooth slots). In some examples, wireless device 105-c may transmit a null signal 215 in a Bluetooth slot of the retransmission window. The null signal 215 may indicate that wireless device 105-c will not send any further transmissions for the duration of eSCO window 240.

In some examples, eSCO window 240 may also include a cooperation window 255. Cooperation window 255 may include signaling between first speaker 110-c and second speaker 115-c to ensure that both first speaker 110-c and second speaker 115-c have successfully received data signal 205. Cooperation window 255 may occur prior to closing eSCO window 240, and may only be initiated upon completion of retransmission window 250.

In some examples, wireless device 105-c may send a data signal 205 to second speaker 115-c. Second speaker 115-c may receive data signal 205. First speaker 110-c may monitor (i.e., sniff) communications on the second piconet based on received information about the second piconet. First speaker 110-c may also receive data signal 205. Second speaker 115-c may transmit, in a second slot of transmission window 245, ACK signal 210, indicating successful receipt of data signal 205. Wireless device 105-c may receive ACK signal 210, and in the first Bluetooth slot of retransmission window 250, may transmit null signal 215. Null signal 215 may indicate that no further transmissions are forthcoming from wireless device 105-c for the duration of eSCO window 240. However, if first speaker 110-c is configured to sniff for data transmissions, first speaker 110-c may not receive null signal 215.

In some cases, despite the transmission of null signal 215 by wireless device 105-c, first speaker 110-c and second speaker 115-c may wait one or more Bluetooth slots before initiating the cooperation window 255. That is, although wireless device 105-c has no further data to transmit and no retransmissions will occur for the duration of eSCO window 240, and although first speaker 110-c and second speaker 115-c have successfully received data signal 205, first speaker 110-c and second speaker 115-c may wait for the full duration of retransmission window 250 before initiating cooperation window 255. If both first speaker 110-c and second speaker 115-c have successfully received data signal 205, then cooperation window 255 may include first speaker 110-c transmitting null signal 220 to second speaker 115-c, and second speaker 115-c transmitting null signal 225 to first speaker 110-c. Upon completion of the cooperation window 255, one of the communicating deices (e.g., a device filling the master device role) may close the eSCO window (e.g., mark the eSCO window as closed).

When the eSCO window is closed, one or more of the communicating devices may enter an idle mode or sleep mode, to conserver power. Thus, the shorter the eSCO window, the more power a device may conserve. Additionally, the shorter the eSCO window, the less bandwidth utilized by a set of communications, allowing for more efficient bandwidth utilization. Wireless device 105-c, for example, may enter an idle mode upon closing eSCO window 240, and may remain in the idle mode until subsequent transmission of data 230 and receipt of signal 235 (e.g., an ACK signal from a slave device such as second speaker 115-c). If a retransmission window 250 includes two Bluetooth slots, then eSCO window 240 will have a duration of six Bluetooth slots (even if nothing occurs in the fourth Bluetooth slot of the eSCO window because data signal 205 has been successfully received by both first speaker 110-c and second speaker 115-c). If a retransmission window 250 includes four Bluetooth slots, then eSCO window 240 will have a duration of eight Bluetooth slots (even if nothing occurs in the fourth, fifth, and sixth Bluetooth slot of the eSCO window because data signal 205 has been successfully received by both first speaker 110-c and second speaker 115-c). Decreased power consumption and more efficient bandwidth usage may be achieved as described in more detail with respect to FIGS. 3-6.

Figure 3:
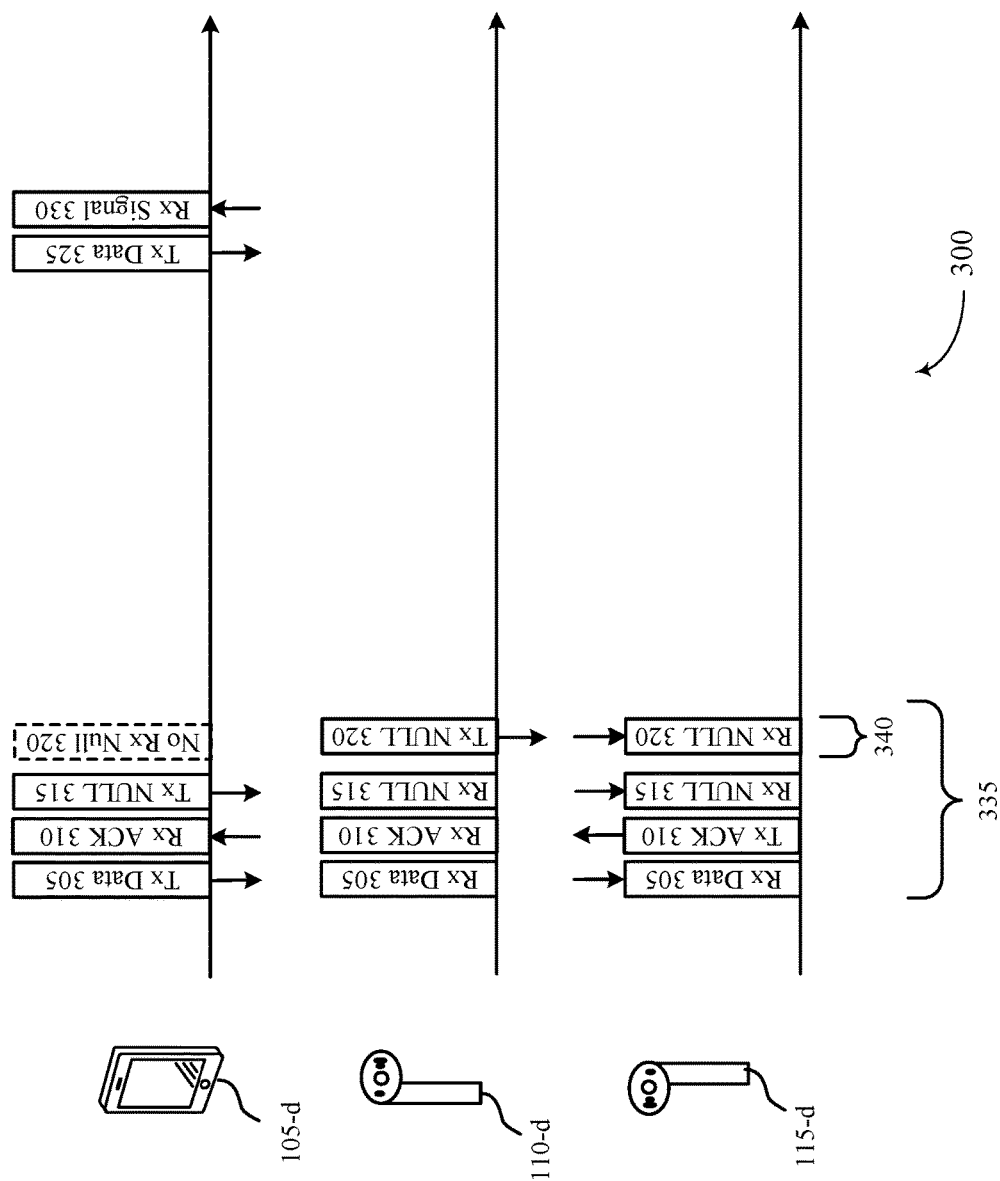
FIG. 3 illustrates an example of a timeline that supports power and bandwidth efficient true wireless stereo speakers in accordance with aspects of the present disclosure.

FIG. 3 illustrates an example of a timeline 300 that supports power and bandwidth efficient true wireless stereo speakers in accordance with aspects of the present disclosure. In some examples, timeline 300 may implement aspects of wireless communications system 100 or wireless communications system 101. For example, wireless device 105-c, first speaker 110-c, and second speaker 110-c may be examples of corresponding devices in wireless communications systems 100 and 101.

In some examples, first speaker 110-d may establish a control channel with second speaker 115-d, and first speaker 110-d and second speaker 115-d may communicate on a first piconet. In some examples, first speaker 110-d may be the master device with respect to the first piconet. In some examples, wireless device 105-d may communicate with second speaker 115-d on a second piconet, and wireless device 105-d may be the master device with respect to the second piconet. Second speaker 115-d may provide information about the second piconet to first speaker 110-d, and first speaker 110-d may monitor (e.g., sniff) communications between wireless device 105-d and second speaker 115-d on the second piconet, based on the received information about the second piconet.

In some examples, second speaker 115-d and first speaker 110-d may successfully receive a data transmission form wireless device 105-d to second speaker 115-d. Wireless device 105-d may transmit and second speaker 115-d may receive, in the first Bluetooth slot of eSCO window 335, data 305 (e.g., voice data). First speaker 110-d may monitor communications on the second piconet and may also receive data 305. Second speaker 1115-d may transmit and wireless device 105-d may receive, in a second Bluetooth slot of eSCO window 335, ACK signal 310, indicating successful receipt of data 305. First speaker 110-d may monitor communications on the second piconet and may also receive ACK signal 310. In some examples, the first and second Bluetooth slots of eSCO window 335 may be a transmission window, as described with respect to FIG. 2.

In a third Bluetooth slot of an eSCO window 335 (e.g., a first Bluetooth slot of a retransmission window) wireless device 105-d may transmit a null signal 315 to second speaker 115-d. First speaker 110-d may monitor communications on the second piconet and may also receive null signal 315. In some examples, null signal 315 may be a null ACK signal. The null portion of the null ACK signal may indicate that wireless device 105-d will not transmit or retransmit any transmissions for the duration of eSCO window 335. The ACK portion of the null ACK signal may indicate that wireless device 105-d received ACK signal 310 and any additional transmissions send by second speaker 115-*e* with ACK signal 410. Upon receipt of null signal 315, first speaker 110-*d* and second speaker 115-*d* may switch from the second piconet (where the wireless device 105-*d* is the master device) to the first piconet (where the first speaker 110-*d* is the master device). First speaker 110-*d* and second speaker 115-*d* may communicate in a cooperation window 340 that is the final portion of eSCO window 335. First speaker 110-*d* may transmit null signal 320 to second speaker 115-*d*. Upon transmission of the null signal 320, which indicates that no additional signaling will occur for the duration of the eSCO window 335, first speaker 110-*d* and second speaker 115-*d* may close eSCO window 335. Speaker 110-*d*, speaker 115-*d*, or wireless device 105-*d* (or each of the three devices) may enter an idle mode upon closing eSCO window 335 until subsequent transmissions (e.g., wireless device may transmit data 325 and receive a signal 330 such as an ACK signal in a subsequent eSCO window).

As described above, in examples where first speaker 110-*d* and second speaker 115-*d* both successfully receive data 305, an eSCO window may be shorted to only four Bluetooth slots (instead of the six or eight required in current schemes as described with respect to FIG. 2). The shortened eSCO window may allow devices in the wireless communications system to sleep for longer, conserving power, and more efficiently utilize available bandwidth. Efficient power and bandwidth usage may still be achieved if first speaker 110-*d* fails to receive data 305, as described in greater detail with respect to FIG. 4.

Figure 4:
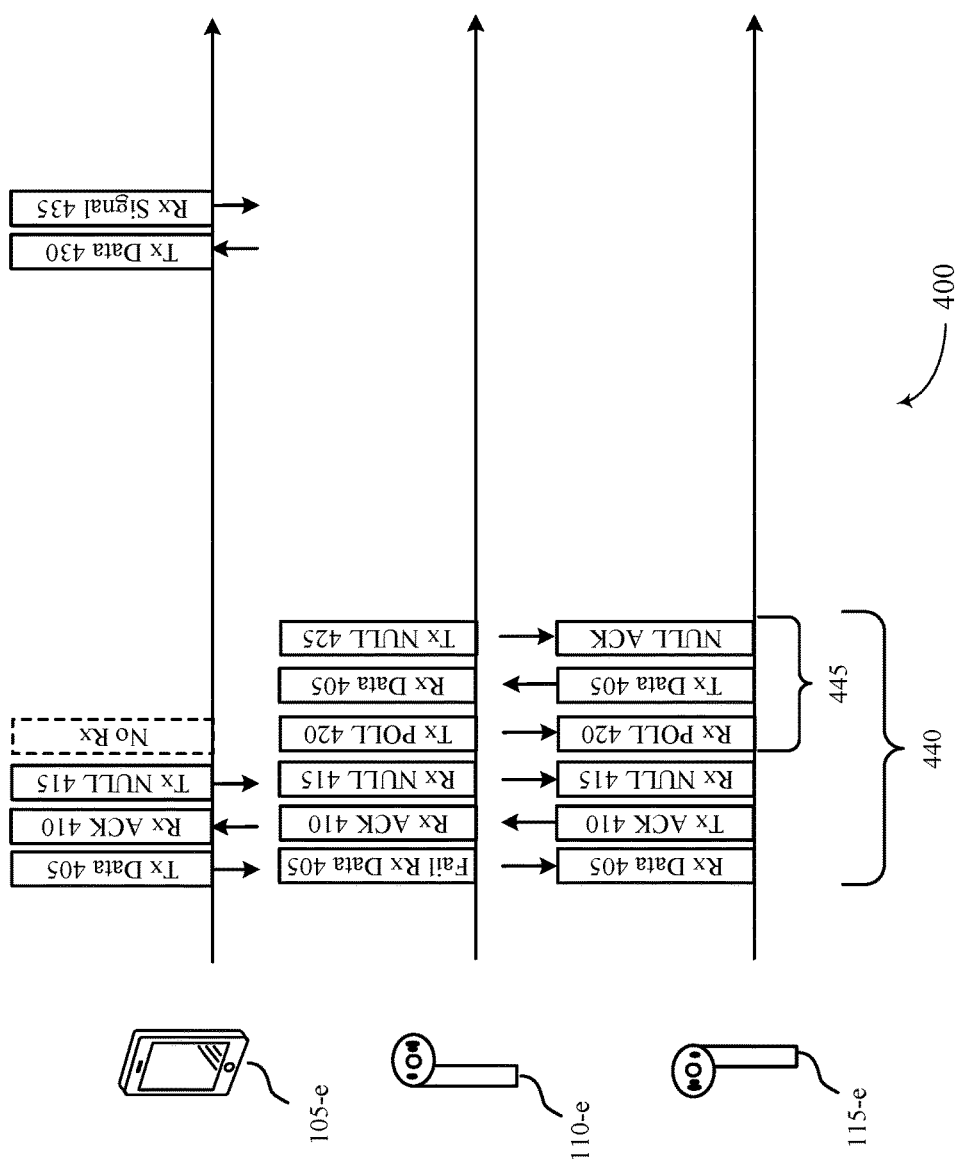
FIG. 4 illustrates an example of a timeline that supports power and bandwidth efficient true wireless stereo speakers in accordance with aspects of the present disclosure.

FIG. 4 illustrates an example of a timeline 400 that supports power and bandwidth efficient true wireless stereo speakers in accordance with aspects of the present disclosure. In some examples, timeline 400 may implement aspects of wireless communications system 100 or wireless communications system 101. For example, wireless device 105-*e*, first speaker 110-*e*, and second speaker 110-*e* may be examples of corresponding devices in wireless communications systems 100 and 101.

In some examples, first speaker 110-*e* may establish a control channel with second speaker 115-*e*, and first speaker 110-*e* and second speaker 115-*e* may communicate on a first piconet. In some examples, first speaker 110-*e* may be the master device with respect to the first piconet. In some examples, wireless device 105-*e* may communicate with second speaker 115-*e* on a second piconet, and wireless device 105-*e* may be the master device with respect to the second piconet. Second speaker 115-*e* may provide information about the second piconet to first speaker 110-*e*, and first speaker 110-*e* may monitor (e.g., sniff) communications between wireless device 105-*e* and second speaker 115-*e* on the second piconet, based on the received information about the second piconet.

In some examples, first speaker 110-*e* may transmit and second speaker 115-*e* may receive, in a first Bluetooth slot of an eSCO window 440, data 405. First speaker 110-*e* may fail to receive data 405. In a second Bluetooth slot of eSCO window 440, second speaker 115-*e* may transmit and wireless device 105-*e* may receive, ACK signal 410. First speaker 110-*e* may also receive ACK signal 410. In a third Bluetooth slot of eSCO window 440 (e.g., a first Bluetooth slot of a retransmission window) wireless device 105-*e* may transmit and second speaker 115-*e* may receive a null signal 415. In some examples, null signal 415 may be a null ACK signal. The null portion of the null ACK signal may indicate that wireless device 105-*e* will not transmit or retransmit any transmissions for the duration of eSCO window 440. The ACK portion of the null ACK signal may indicate that wireless device 105-*e* received ACK signal 410 and any additional transmissions send by second speaker 115-*e* with ACK signal 410.

Upon receiving null signal 415, first speaker 110-*e* and second speaker 115-*e* may switch from the second piconet to the first piconet, and may communicate on the first piconet during cooperation window 445 until closing eSCO window 440. In a first slot of cooperation window 445 (which may coincide with a second Bluetooth slot of a Bluetooth slot pair in a retransmission window of the eSCO window), first speaker 110-*e* may transmit a poll signal 420 to second speaker 115-*e*. In some examples, first speaker 110-*e* may determine that, based on the received ACK signal 410, second speaker 115-*e* successfully received data 405 (which first speaker 110-*e* did not successfully receive). Based on this determination, may transmit poll signal 420. Poll signal 415 may include a request for second speaker 115-*e* to transmit data 405 to first speaker 110-*e*. In a second Bluetooth slot of cooperation window 445, second speaker 115-*e* may transmit data 405 to first speaker 110-*e*. First speaker 110-*e* may receive data 405, and may transmit in response, in the following Bluetooth slot, a null signal 425 to second speaker 115-*e*. Null signal 425 may be a null ACK signal. The null portion of the null ACK signal may indicate that first speaker 110-*e* will not transmit or retransmit any transmissions for the duration of eSCO window 440. The ACK portion of the null ACK signal may indicate that first speaker 110-*e* received data 405, and any additional transmissions send by second speaker 115-*e* with data 405.

Upon transmission of null signal 425, first speaker 110-*e* and second speaker 115-*e* may close eSCO window 440. Upon closing eSCO window 440, wireless device 105-3, first speaker 110-*e*, and second speaker 115-*e*, may enter idle mode until subsequent transmission of data 430 and receipt of signal 435 (e.g., an ACK signal from a slave device such as second speaker 115-*e*). Closing the eSCO window upon completion of cooperation window 445 may result in more efficient power and bandwidth use. In such examples, where first speaker 110-*e* fails to receive the first transmission of data 405, the cooperation window 445 may be three Bluetooth slots long. However, the total duration of eSCO window 440 may be six Bluetooth slots. This may still be a shorter eSCO window duration than the same case where the cooperation window does not begin until completion of a retransmission window. In cases where the retransmission window is four Bluetooth slots, the minimum duration of the eSCO window may be eight Bluetooth slots. Thus, in such cases, even where the first speaker 110-*e* fails to receive the first transmission of data 405, a total eSCO window duration of six slots may still be shorter than the minimum eight slot duration of current schemes. In some examples, efficient power and bandwidth use may be achieved even in cases where second speaker 115-*f* fails to receive a data transmission, as described in greater detail with respect to FIGS. 5 and 6.

Figure 5:
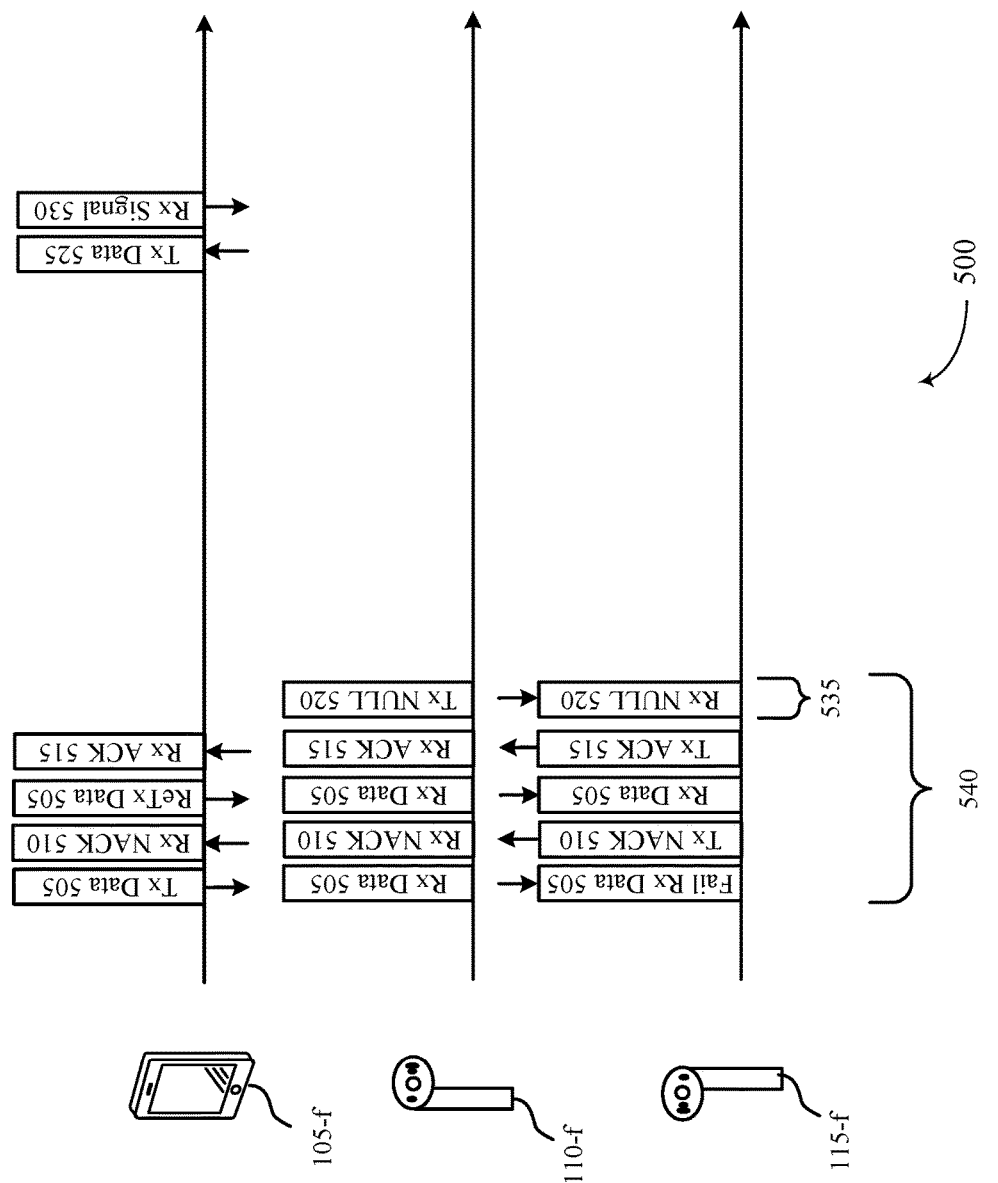
FIG. 5 illustrates an example of a timeline that supports power and bandwidth efficient true wireless stereo speakers in accordance with aspects of the present disclosure.

FIG. 5 illustrates an example of a timeline 500 that supports power and bandwidth efficient true wireless stereo speakers in accordance with aspects of the present disclosure. In some examples, timeline 500 may implement aspects of wireless communications system 100 or wireless communications system 101. For example, wireless device 105-*c*, first speaker 110-*c*, and second speaker 110-*c* may be examples of corresponding devices in wireless communications systems 100 and 101.

In some examples, first speaker 110-*f* may establish a control channel with second speaker 115-*f*, and first speaker 110-*f* and second speaker 115-*f* may communicate on a first piconet. In some examples, first speaker 110-*f* may be the master device with respect to the first piconet. In some examples, wireless device 105-*f* may communicate with second speaker 115-*e* on a second piconet, and wireless device 105-*f* may be the master device with respect to the second piconet. Second speaker 115-*f* may provide information about the second piconet to first speaker 110-*f*, and first speaker 110-*f* may monitor (e.g., sniff) communications between wireless device 105-*f* and second speaker 115-*f* on the second piconet, based on the received information about the second piconet.

In some examples, second speaker 115-*f* may fail to receive a first transmission of data 505. In a first Bluetooth slot of eSCO window 540, wireless device 105-*f* may transmit data 505. Second speaker 115-*f* may fail to receive data 505. However, first speaker 110-*f*, which may be monitoring communications on the second piconet, may successfully receive data 505. In a second Bluetooth slot of eSCO window 540, second speaker 115-*f* may transmit a NACK signal 510. NACK signal 510 may indicate that second speaker 115-*f* failed to receive data 505. Wireless device 105-*f* may receive NACK signal 510, and first speaker 110-*f* may also receive NACK signal 510, and may determine that second speaker 115-*f* did not successfully receive data 505 in the first Bluetooth slot.

In a third Bluetooth slot of eSCO window 540 (e.g., a first Bluetooth slot of a retransmission window) wireless device 105-*f* may retransmit data 505 to second speaker 115-*f* Second speaker 115-*f* may successfully receive retransmitted data 505. First speaker 110-*f* may also receive retransmitted data 505. In a fourth slot of eSCO window 540, second speaker 115-*f* may transmit, and wireless device 105-*f* may receive, an ACK signal 515 indicating that second speaker 115-*f* successfully received retransmitted data 505.

First speaker 110-*f* and second speaker 115-*f* may switch from the second piconet to the first piconet and initiate a cooperation window 535. The transmission of the ACK signal 515 from second speaker 115-*f* to wireless device 105-*f* may trigger the switch from the second piconet to the first piconet. First speaker 110-*f* may transmit and second speaker 115-*f* may receive null signal 520. Null signal 520 may indicate that no first speaker 110-*f* will not send any further transmissions or retransmissions for the duration of eSCO window 540. In some examples, speaker 110-*f* may determine, based on received ACK signal 515, that second speaker 115-*f* has successfully received retransmitted data 505. Based on this determination, first speaker 115-*f* may determine that there no retransmissions are necessary, because first speaker 110-*f* received data 505 in the first Bluetooth slot of eSCO window 540, and second speaker 115-*f* received retransmitted data 505 in the third Bluetooth slot of the eSCO window. Based on the transmitted null signal 520, first speaker 110-*f* and second speaker 115-*f* may close eSCO window 540. Upon closing eSCO window 540, wireless device 105-*f*, first speaker 110-*f*, and second speaker 115-*f*, may enter idle mode until subsequent transmission of data 525 and receipt of signal 530 (e.g., an ACK signal from a slave device such as second speaker 115-*f*).

In such examples, where second speaker 110-*e* fails to receive the first transmission of data 505, the cooperation window 535 may be only one Bluetooth slots long. Thus, the total duration of eSCO window 540 may be only five Bluetooth slots long. In some examples, efficient power and bandwidth use may be achieved even in cases where second speaker 115-*f* fails to receive a data transmission and a data retransmission, as described in greater detail with respect to FIG. 6.

Figure 6:
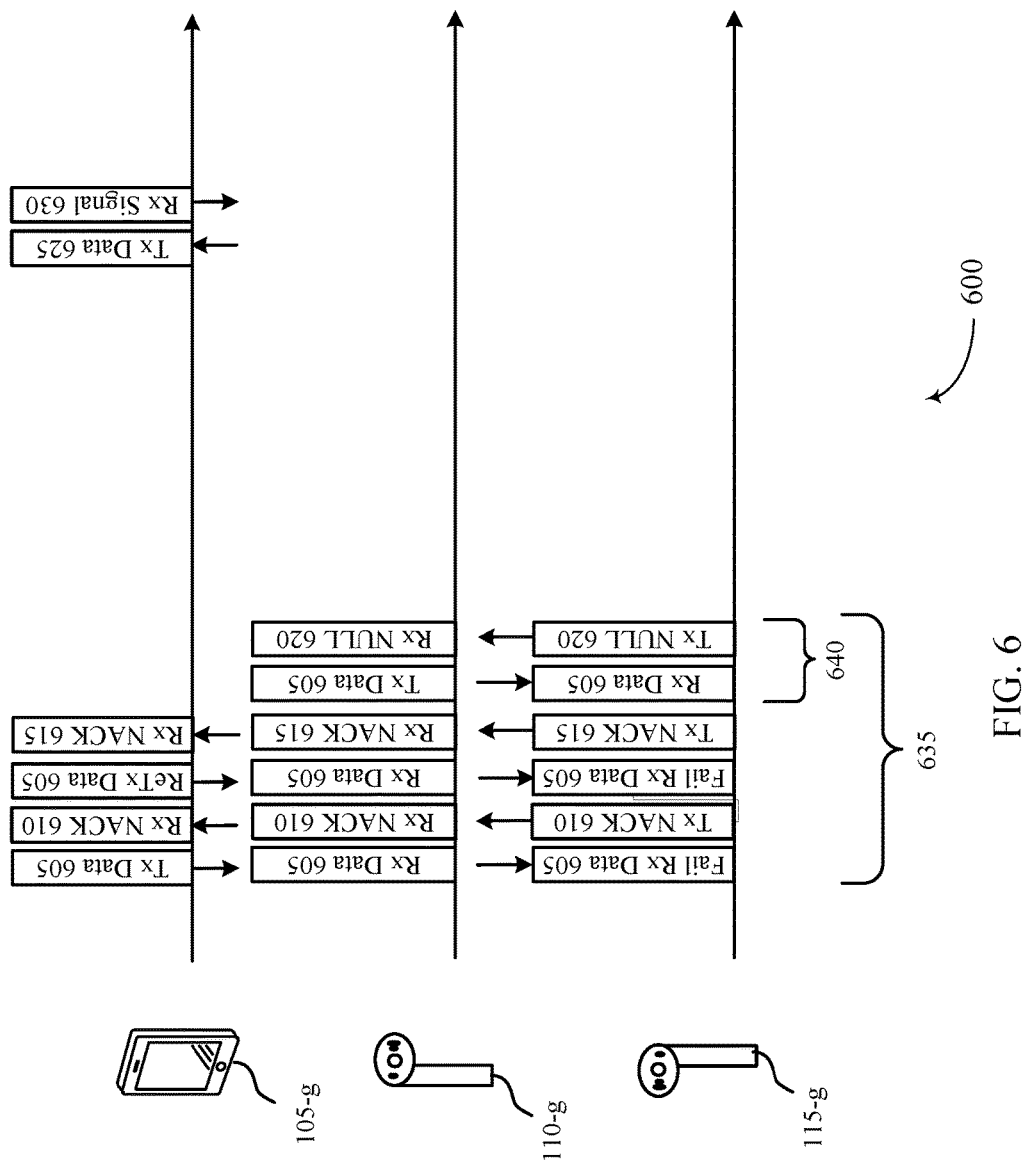
FIG. 6 illustrates an example of a timeline that supports power and bandwidth efficient true wireless stereo speakers in accordance with aspects of the present disclosure.

FIG. 6 illustrates an example of a timeline 600 that supports power and bandwidth efficient true wireless stereo speakers in accordance with aspects of the present disclosure. In some examples, timeline 600 may implement aspects of wireless communications system 100 or wireless communications system 101. For example, wireless device 105-*c*, first speaker 110-*c*, and second speaker 110-*c* may be examples of corresponding devices in wireless communications systems 100 and 101.

In some examples, first speaker 110-*g* may establish a control channel with second speaker 115-*g*, and first speaker 110-*g* and second speaker 115-*g* may communicate on a first piconet. In some examples, first speaker 110-*g* may be the master device with respect to the first piconet. In some examples, wireless device 105-*g* may communicate with second speaker 115-*g* on a second piconet, and wireless device 105-*g* may be the master device with respect to the second piconet. Second speaker 115-*g* may provide information about the second piconet to first speaker 110-*g*, and first speaker 110-*g* may monitor (e.g., sniff) communications between wireless device 105-*g* and second speaker 115-*g* on the second piconet, based on the received information about the second piconet.

In some examples, second speaker 115-*g* may fail to receive a transmission and a retransmission of data 605. In a first Bluetooth slot of eSCO window 635, wireless device 105-*g* may transmit data 605. Second speaker 115-*g* may fail to receive data 605. However, first speaker 110-*g*, which may be monitoring communications on the second piconet, may successfully receive data 605. In a second Bluetooth slot of eSCO window 635, second speaker 115-*g* may transmit a NACK signal 610. NACK signal 610 may indicate that second speaker 115-*g* failed to receive data 605. Wireless device 105-*g* may receive NACK signal 610, and first speaker 110-*g* may also receive NACK signal 610, and may determine that second speaker 115-*g* did not successfully receive data 605 in the first Bluetooth slot.

In a third Bluetooth slot of eSCO window 635 (e.g., a first Bluetooth slot of a retransmission window) wireless device 105-*g* may retransmit data 605 to second speaker 115-*g*. Second speaker 115-*g* may fail to successfully receive retransmitted data 605. First speaker 110-*f* may receive retransmitted data 605. In a fourth slot of eSCO window 635, second speaker 115-*g* may transmit, and wireless device 105-*f* may receive, an NACK signal 615 indicating that second speaker 115-*g* failed to successfully receive retransmitted data 605.

First speaker 110-*g* may determine, based on NACK signal 610 and NACK signal 615, the second speaker 115-*g* has not successfully received data 605. First speaker 110-*g* and second speaker 115-*g* may switch, in a fifth Bluetooth slot of eSCO window 635, from the second piconet to the first piconet. NACK signal 615 may trigger the switch form the second piconet to the first piconet. Upon switching from the second piconet to the first piconet, first speaker 110-*g* and second speaker 115-*g* may initiate a cooperation window 640. Having determined that second speaker 115-*g* did not successfully receive data 605, first speaker 110-*g* may transmit and second speaker 115-*g* may receive data 605. In a second Bluetooth slot of cooperation window 640, second speaker 115-*g* may transmit and first speaker 110-*g* may receive null signal 620. Null signal 620 may be a null ACK signal. The null portion of the null ACK signal may indicate that second speaker 115-*g* will not send any subsequent transmissions for the duration of eSCO window 635. The ACK portion of the null ACK signal may indicate that second speaker 115-*g* successfully received data 605. Based on the null signal 620, first speaker 110-g and second speaker 115-g may close the eSCO window 635. Wireless device 105-g, first speaker 110-g, or second speaker 115-g may enter an idle mode upon closing eSCO window 635. Wireless device 105-g, for example, may remain in an idle mode until subsequent transmissions of data 625 and reception of signal 630 (e.g., an ACK signal).

In cases as described above, where second speaker 115-g fails to receive transmission and retransmission of data 605, the total eSCO window duration may be six Bluetooth slots. This may be equal to or shorter than minimum eSCO window durations under current schemes because first speaker 110-g may be able to determine that second speaker 115-g failed to receive data 605 based on monitoring for and receiving NACK signal 610 and NACK signal 615. This determination may allow first speaker 115-g to immediately retransmit data 605 in the first Bluetooth slot of cooperation window 640, resulting in a shorter cooperation window and a shorter eSCO window.

Figure 7:
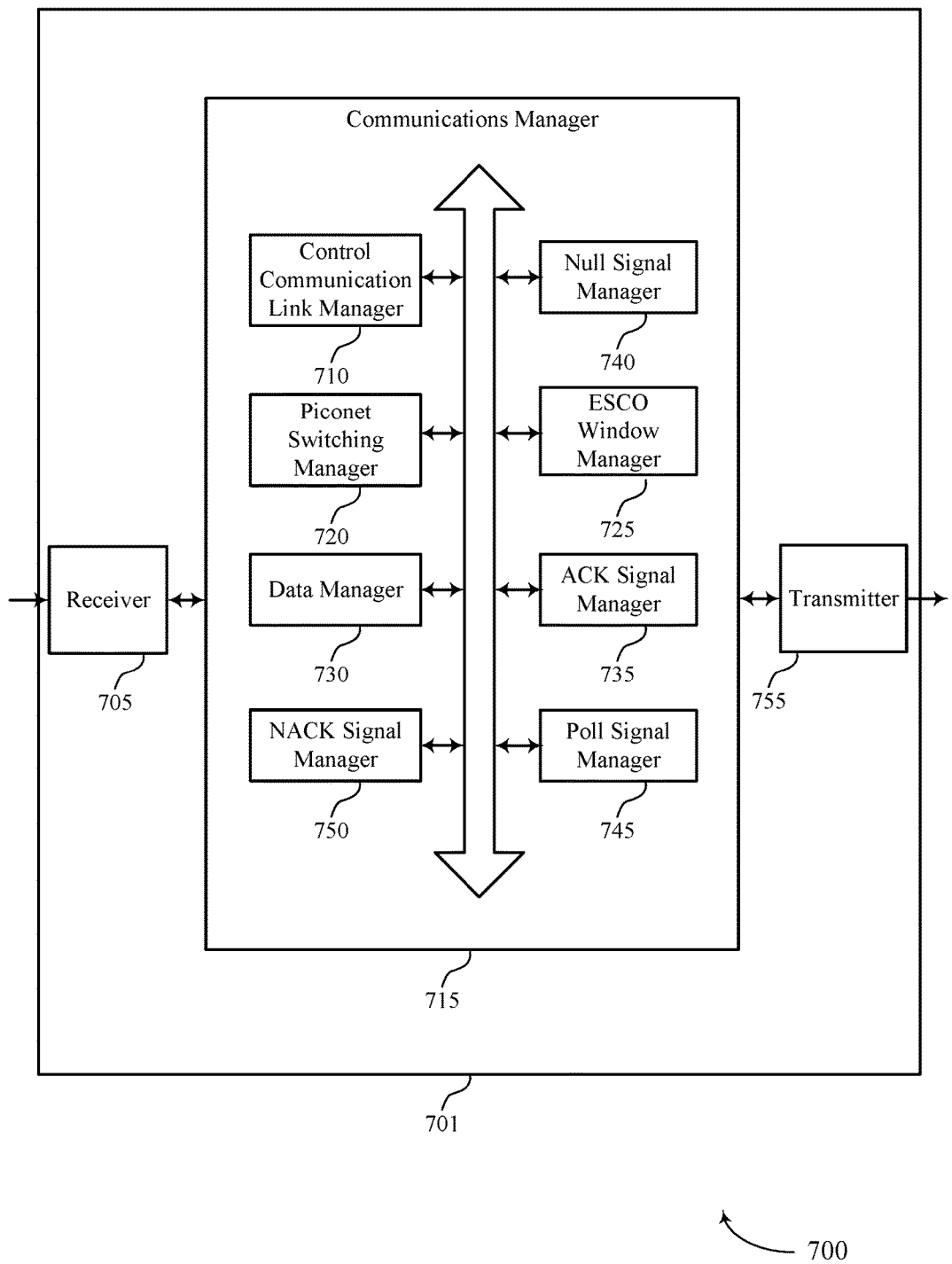
FIG. 7 shows a block diagram of devices that support power and bandwidth efficient true wireless stereo speakers in accordance with aspects of the present disclosure.

FIG. 7 shows a block diagram 700 of a device 701 that supports power and bandwidth efficient true wireless stereo speakers in accordance with aspects of the present disclosure. The device 701 may be an example of aspects of a device as described herein. The device 701 may include a receiver 705, a communications manager 715, and a transmitter 755. The device 701 may also include a processor. Each of these components may be in communication with one another (e.g., via one or more buses).

The receiver 705 may receive information such as packets, user data, or control information associated with various information channels (e.g., control channels, data channels, and information related to power and bandwidth efficient true wireless stereo speakers, etc.). Information may be passed on to other components of the device 701. The receiver 705 may be an example of aspects of the transceiver 1020 described with reference to FIG. 10. The receiver 705 may utilize a single antenna or a set of antennas.

The communications manager 715 may establish a control communication link with a second speaker over a first piconet, receive, in a first slot of an extended synchronous connection-oriented (eSCO) window on a second piconet, a first null signal sent from a wireless device to the second speaker, transmit to the second speaker, on the first piconet, a second null signal based on the first null signal, switch, in a second slot of the eSCO window that is consecutive to the first slot, and based on the first null signal, from the second piconet to the first piconet, and close the eSCO window based on the second null signal. The communications manager 715 may also establish a control communication link with a second speaker over a first piconet, receive, in a first slot of an extended synchronous connection-oriented (eSCO) window on a second piconet, an acknowledgment (ACK) signal or a NACK signal sent from the second speaker to the wireless device, close the eSCO window based on the communicating, switch, in a second slot of the eSCO window and based on the received ACK signal or NACK signal, from the second piconet to the first piconet, and communicate with the second speaker on the first piconet based on the received ACK signal or NACK signal. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 715 may include a control communication link manager 710, a null signal manager 740, a piconet switching manager 720, an eSCO window manager 725, a data manager 730, an ACK signal manager 735, a poll signal manager 745, and a NACK signal manager 750. Each of these modules may communicate, directly or indirectly, with one another (e.g., via one or more buses).

The control communication link manager 710 may establish a control communication link with a second speaker over a first piconet. In some examples, the control communication link manager 710 may establish a control communication link with a second speaker over a first piconet. In some examples, the control communication link manager 710 may receive, from the second speaker, information about the second piconet information.

In some examples, the control communication link manager 710 may perform sniffing procedures to detect signaling between the wireless device and the second speaker on the second piconet based on the received information about the second piconet. In some examples, the control communication link manager 710 may receive, from the second speaker, information about the second piconet. In some examples, the control communication link manager 710 may perform sniffing procedures to detect signaling between the wireless device and the second speaker on the second piconet based on the received information about the second piconet.

The null signal manager 740 may receive, in a first slot of an extended synchronous connection-oriented (eSCO) window on a second piconet, a first null signal sent from a wireless device to the second speaker. In some examples, the null signal manager 740 may transmit to the second speaker, on the first piconet, a second null signal based on the first null signal. In some examples, the null signal manager 740 may transmit to the second speaker, on the first piconet, the second null signal in the second slot based on the received data transmission sent from the wireless device to the second speaker and the received ACK signal sent from the second speaker to the wireless device.

In some examples, the null signal manager 740 may receive, on the second piconet, the first null signal sent from the wireless device to the second speaker, where the first null signal is a null ACK signal corresponding to the received ACK signal. In some examples, the null signal manager 740 may transmit to the second speaker, on the first piconet and based on receiving the data transmission, the second null signal, where the null signal is a null ACK signal corresponding to the received data transmission. In some examples, the null signal manager 740 may determine, based on receiving the first null signal, that the wireless device will not send more transmissions to the second speaker for the duration of the eSCO window.

In some examples, the null signal manager 740 may transmit to the second speaker, on the first piconet, a null signal, based on the received ACK signal sent from the second speaker to the wireless device. The null signal manager 740 may receive, on the second piconet, the first null signal sent from the wireless device to the second speaker, where the first null signal is a null ACK signal that is based on the received ACK signal. In some examples, the null signal manager 740 may receive from the second speaker, on the first piconet a null ACK signal corresponding to the retransmission of the received data transmission.

The piconet switching manager 720 may switch, in a second slot of the eSCO window that is consecutive to the first slot, and based on the first null signal, from the second piconet to the first piconet. In some examples, the piconet switching manager 720 may switch, in a second slot of the eSCO window and based on the received ACK signal or NACK signal, from the second piconet to the first piconet. In some examples, the piconet switching manager 720 may communicate with the second speaker on the first piconet based on the received ACK signal or NACK signal. In some examples, the piconet switching manager 720 may switch to the first piconet based on the determining. In some examples, the piconet switching manager 720 may switch to the first piconet based on the determining. In some cases, the first slot is a first slot of a first Bluetooth slot pair corresponding to the second piconet, and the second slot is a first slot of a second Bluetooth slot pair corresponding to the first piconet. In some cases, the first speaker is a master device and the second speaker is a slave device with respect to the first piconet, and where the wireless device is a master device and the second speaker is a slave device with respect to the second piconet.

The eSCO window manager 725 may close the eSCO window based on the second null signal. In some examples, the eSCO window manager 725 may receive, in a first slot of an extended synchronous connection-oriented (eSCO) window on a second piconet, an acknowledgment (ACK) signal or a NACK signal sent from the second speaker to the wireless device. In some examples, the eSCO window manager 725 may close the eSCO window based on the communicating. In some examples, the eSCO window manager 725 may determine, based on receiving the ACK signal or NACK signal, that the wireless device will not send more transmissions to the second speaker for the duration of the eSCO window. In some cases, the first slot is a last slot in a retransmission window of the eSCO window, and the second slot is a first slot in a cooperation window of the eSCO window.

The data manager 730 may receive, on the second piconet, a data transmission sent from the wireless device to the second speaker. In some examples, the data manager 730 may fail to receive, on the second piconet, a data transmission sent from the wireless device to the second speaker. In some examples, the data manager 730 may receive from the second speaker, on the first piconet and based on the poll signal, the data transmission. In some examples, the data manager 730 may receive, on the second piconet, a data transmission sent from the wireless device to the second speaker. In some examples, the data manager 730 may receive, on the second piconet, a retransmission of the data transmissions sent from the wireless device to the second speaker based at least in part of the NACK signal.

In some examples, the data manager 730 may receive, on the second piconet, a retransmission of the data transmissions sent from the wireless device to the second speaker based at least in part of the first NACK signal. In some examples, the data manager 730 may transmit to the second speaker, on the first piconet, a retransmission of received data transmission.

The ACK signal manager 735 may receive, on the second piconet, an ACK signal sent from the second speaker to the wireless device, the ACK signal corresponding to the received data transmission. In some examples, the ACK signal manager 735 may receive, on the second piconet, an ACK signal sent from the second speaker to the wireless device based on the received data transmission. In some examples, the ACK signal manager 735 may receive, on the second piconet, an ACK signal sent from the second speaker to the wireless device, the ACK signal indicating that the second speaker successfully received the retransmission of the data transmission.

The poll signal manager 745 may transmit to the second speaker, on the first piconet, a poll signal requesting the data transmission sent from the wireless device to the second speaker.

The NACK signal manager 750 may receive, on the second piconet, a NACK signal sent from the second speaker to the wireless device, the NACK signal indicating that the second speaker did not successfully receive the data transmission. In some examples, the NACK signal manager 750 may receive, on the second piconet, a first NACK signal sent from the second speaker to the wireless device, the first NACK signal indicating that the second speaker did not successfully receive the data transmission. In some examples, the NACK signal manager 750 may receive, on the second piconet, a second NACK signal sent from the second speaker to the wireless device, the second NACK signal indicating that the second speaker did not successfully received the retransmission of the data transmission.

The transmitter 755 may transmit signals generated by other components of the device 701. In some examples, the transmitter 755 may be collocated with a receiver 705 in a transceiver module. For example, the transmitter 755 may be an example of aspects of the transceiver 1020 described with reference to FIG. 10. The transmitter 755 may utilize a single antenna or a set of antennas.

Figure 8:
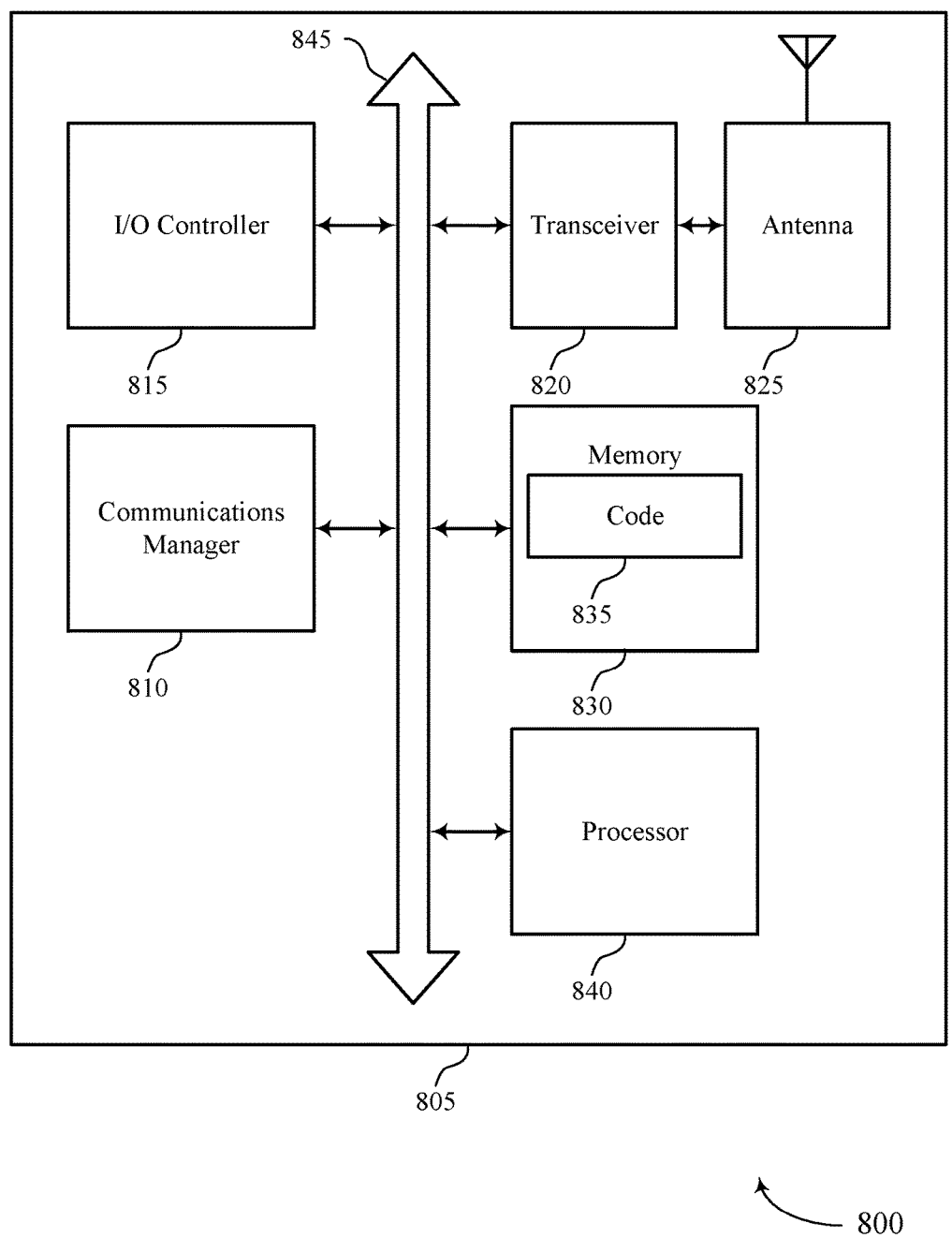
FIG. 8 shows a diagram of a system including a device that supports power and bandwidth efficient true wireless stereo speakers in accordance with aspects of the present disclosure.

FIG. 8 shows a diagram of a system 800 including a device 805 that supports power and bandwidth efficient true wireless stereo speakers in accordance with aspects of the present disclosure. The device 805 may be an example of or include the components of device 701, or a device as described herein. The device 805 may include components for bidirectional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a control communication link with a second speaker over a first piconet, receive, in a first slot of an extended synchronous connection-oriented (eSCO) window on a second piconet, a first null signal sent from a wireless device to the second speaker, transmit to the second speaker, on the first piconet, a second null signal based on the first null signal, switch, in a second slot of the eSCO window that is consecutive to the first slot, and based on the first null signal, from the second piconet to the first piconet, and close the eSCO window based on the second null signal. The communications manager 810 may also establish a control communication link with a second speaker over a first piconet, receive, in a first slot of an extended synchronous connection-oriented (eSCO) window on a second piconet, an acknowledgment (ACK) signal or a NACK signal sent from the second speaker to the wireless device, close the eSCO window based on the communicating, switch, in a second slot of the eSCO window and based on the received ACK signal or NACK signal, from the second piconet to the first piconet, and communicate with the second speaker on the first piconet based on the received ACK signal or NACK signal.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting power and bandwidth efficient true wireless stereo speakers).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
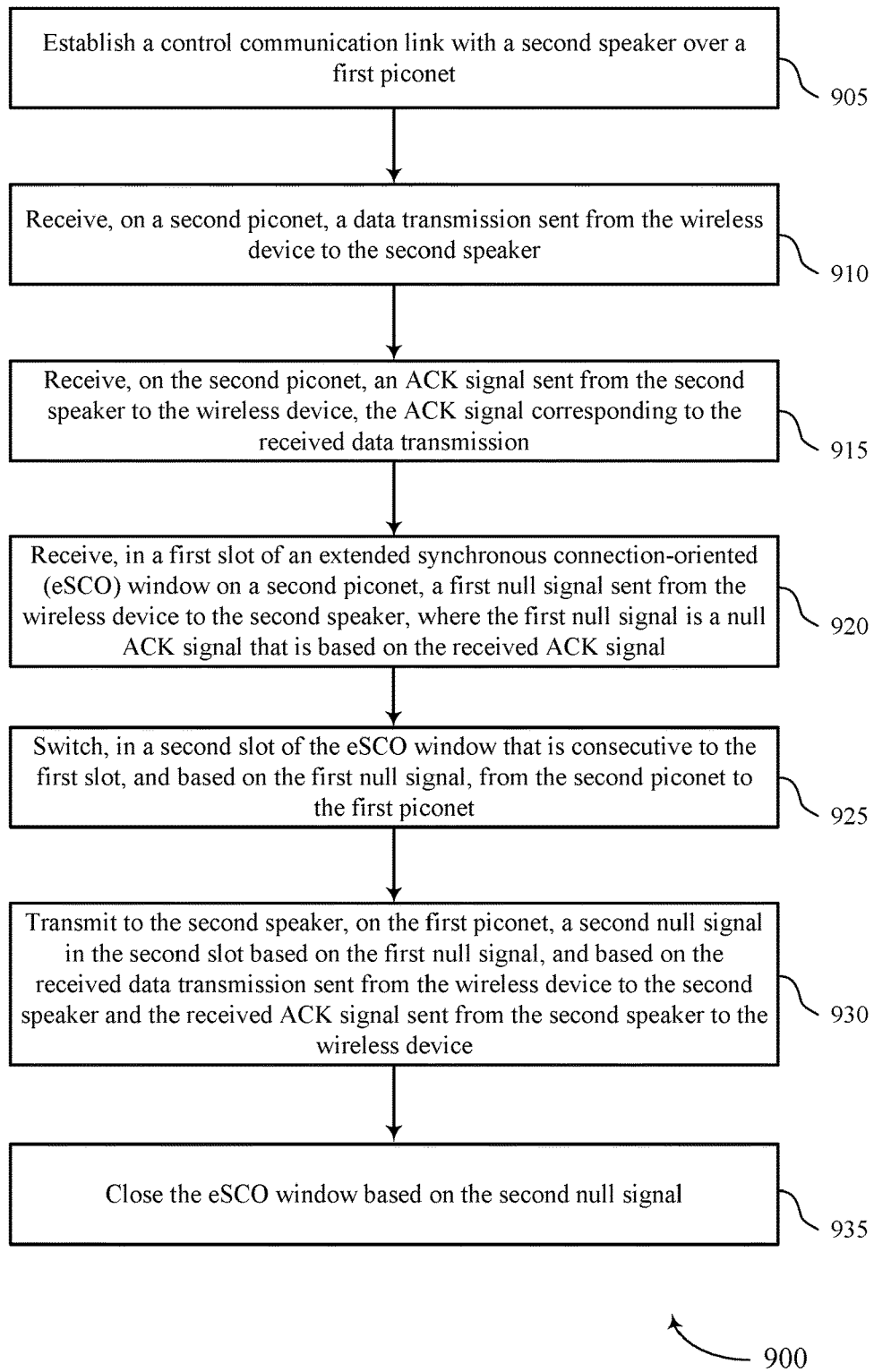
FIGS. 9-12 show flowcharts illustrating methods that support power and bandwidth efficient true wireless stereo speakers in accordance with aspects of the present disclosure.

FIG. 9 shows a flowchart illustrating a method 900 that supports power and bandwidth efficient true wireless stereo speakers in accordance with aspects of the present disclosure. The operations of method 900 may be implemented by a device or its components as described herein. For example, the operations of method 900 may be performed by a communications manager as described with reference to FIGS. 7 through 8. In some examples, a device may execute a set of instructions to control the functional elements of the device to perform the functions described below. Additionally, or alternatively, a device may perform aspects of the functions described below using special-purpose hardware.

At 905, the device may establish a control communication link with a second speaker over a first piconet. The operations of 905 may be performed according to the methods described herein. In some examples, aspects of the operations of 905 may be performed by a control communication link manager as described with reference to FIGS. 7 through 8.

At 910, the device may receive, on the second piconet, a data transmission sent from the wireless device to the second speaker. The operations of 910 may be performed according to the methods described herein. In some examples, aspects of the operations of 910 may be performed by a data manager as described with reference to FIGS. 7 through 8.

At 915, the device may receive, on the second piconet, an ACK signal sent from the second speaker to the wireless device, the ACK signal corresponding to the received data transmission. The operations of 915 may be performed according to the methods described herein. In some examples, aspects of the operations of 915 may be performed by an ACK signal manager as described with reference to FIGS. 7 through 8.

At 920, the device may receive, in a first slot of an extended synchronous connection-oriented (eSCO) window on a second piconet, a first null signal sent from a wireless device to the second speaker, where the first null signal is a null ACK signal that is based on the received ACK signal. The operations of 920 may be performed according to the methods described herein. In some examples, aspects of the operations of 920 may be performed by a null signal manager as described with reference to FIGS. 7 through 8.

At 925, the device may switch, in a second slot of the eSCO window that is consecutive to the first slot, and based on the first null signal, from the second piconet to the first piconet. The operations of 925 may be performed according to the methods described herein. In some examples, aspects of the operations of 925 may be performed by a piconet switching manager as described with reference to FIGS. 7 through 8.

At 930, the device may transmit to the second speaker, on the first piconet, a second null signal in the second slot based on the first null signal, and based on the received data transmission sent from the wireless device to the second speaker and the received ACK signal sent from the second speaker to the wireless device. The operations of 930 may be performed according to the methods described herein. In some examples, aspects of the operations of 930 may be performed by a null signal manager as described with reference to FIGS. 7 through 8.

At 935, the device may close the eSCO window based on the second null signal. The operations of 935 may be performed according to the methods described herein. In some examples, aspects of the operations of 935 may be performed by an eSCO window manager as described with reference to FIGS. 7 through 8.

Figure 10:
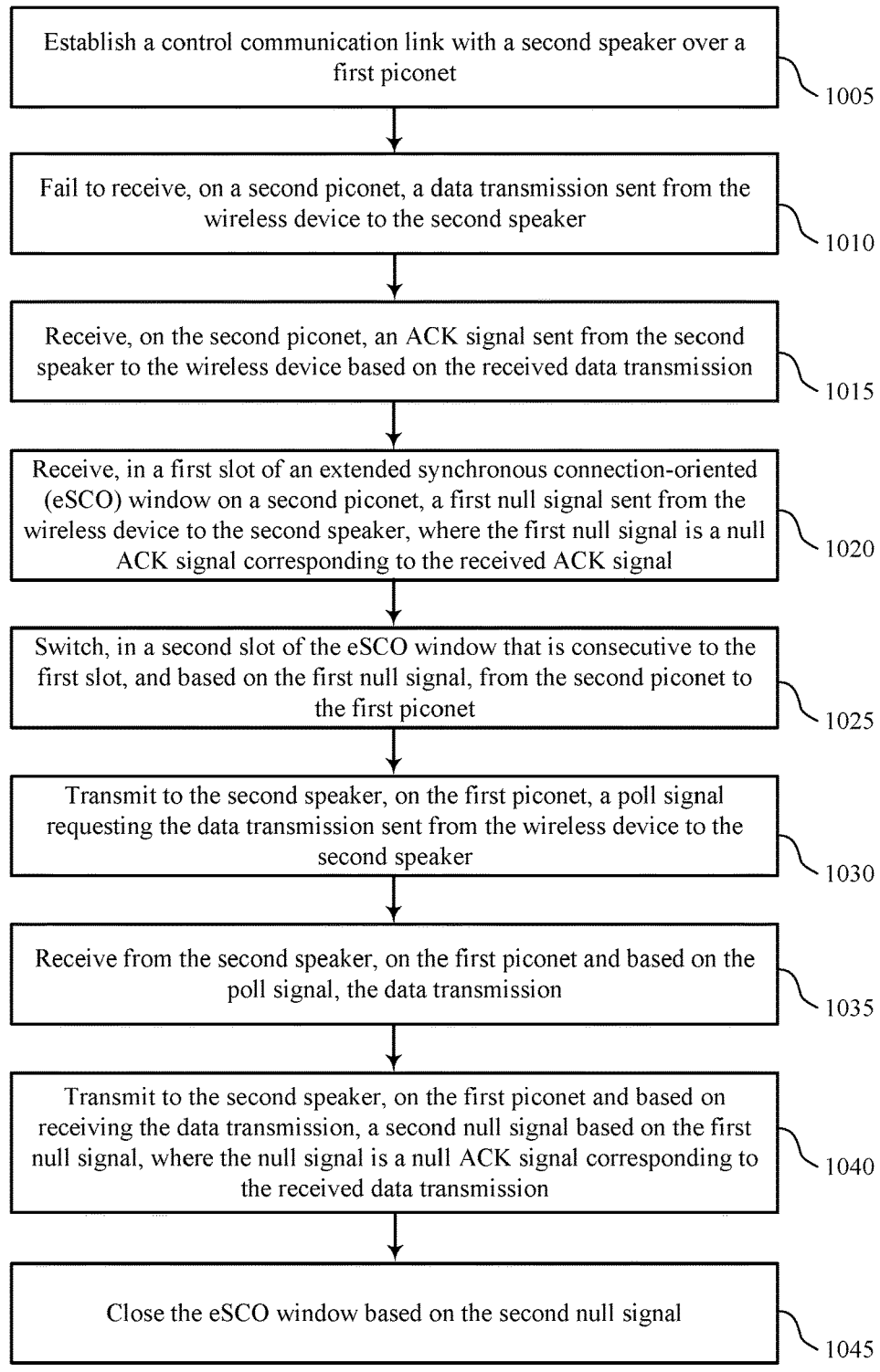

FIG. 10 shows a flowchart illustrating a method 1000 that supports power and bandwidth efficient true wireless stereo speakers in accordance with aspects of the present disclosure. The operations of method 1000 may be implemented by a device or its components as described herein. For example, the operations of method 1000 may be performed by a communications manager as described with reference to FIGS. 7 through 8. In some examples, a device may execute a set of instructions to control the functional elements of the device to perform the functions described below. Additionally, or alternatively, a device may perform aspects of the functions described below using special-purpose hardware.

At 1005, the device may establish a control communication link with a second speaker over a first piconet. The operations of 1005 may be performed according to the methods described herein. In some examples, aspects of the operations of 1005 may be performed by a control communication link manager as described with reference to FIGS. 7 through 8.

At 1010, the device may fail to receive, on the second piconet, a data transmission sent from the wireless device to the second speaker. The operations of 1010 may be performed according to the methods described herein. In some examples, aspects of the operations of 1010 may be performed by a data manager as described with reference to FIGS. 7 through 8.

At 1015, the device may receive, on the second piconet, an ACK signal sent from the second speaker to the wireless device based on the received data transmission. The operations of 1015 may be performed according to the methods described herein. In some examples, aspects of the operations of 1015 may be performed by an ACK signal manager as described with reference to FIGS. 7 through 8.

At 1020, the device may receive, in a first slot of an extended synchronous connection-oriented (eSCO) window on a second piconet, a first null signal sent from a wireless device to the second speaker, where the first null signal is a null ACK signal corresponding to the received ACK signal. The operations of 1020 may be performed according to the methods described herein. In some examples, aspects of the operations of 1020 may be performed by a null signal manager as described with reference to FIGS. 7 through 8.

At 1025, the device may switch, in a second slot of the eSCO window that is consecutive to the first slot, and based on the first null signal, from the second piconet to the first piconet. The operations of 1025 may be performed according to the methods described herein. In some examples, aspects of the operations of 1025 may be performed by a piconet switching manager as described with reference to FIGS. 7 through 8.

At 1030, the device may transmit to the second speaker, on the first piconet, a poll signal requesting the data transmission sent from the wireless device to the second speaker. The operations of 1030 may be performed according to the methods described herein. In some examples, aspects of the operations of 1030 may be performed by a poll signal manager as described with reference to FIGS. 7 through 8.

At 1035, the device may receive from the second speaker, on the first piconet and based on the poll signal, the data transmission. The operations of 1035 may be performed according to the methods described herein. In some examples, aspects of the operations of 1035 may be performed by a data manager as described with reference to FIGS. 7 through 8.

At 1040, the device may transmit to the second speaker, on the first piconet and based on receiving the data transmission, a second null signal based on the first null signal, where the null signal is a null ACK signal corresponding to the received data transmission. The operations of 1040 may be performed according to the methods described herein. In some examples, aspects of the operations of 1040 may be performed by a null signal manager as described with reference to FIGS. 7 through 8.

At 1045, the device may close the eSCO window based on the second null signal. The operations of 1045 may be performed according to the methods described herein. In some examples, aspects of the operations of 1045 may be performed by an eSCO window manager as described with reference to FIGS. 7 through 8.

Figure 11:
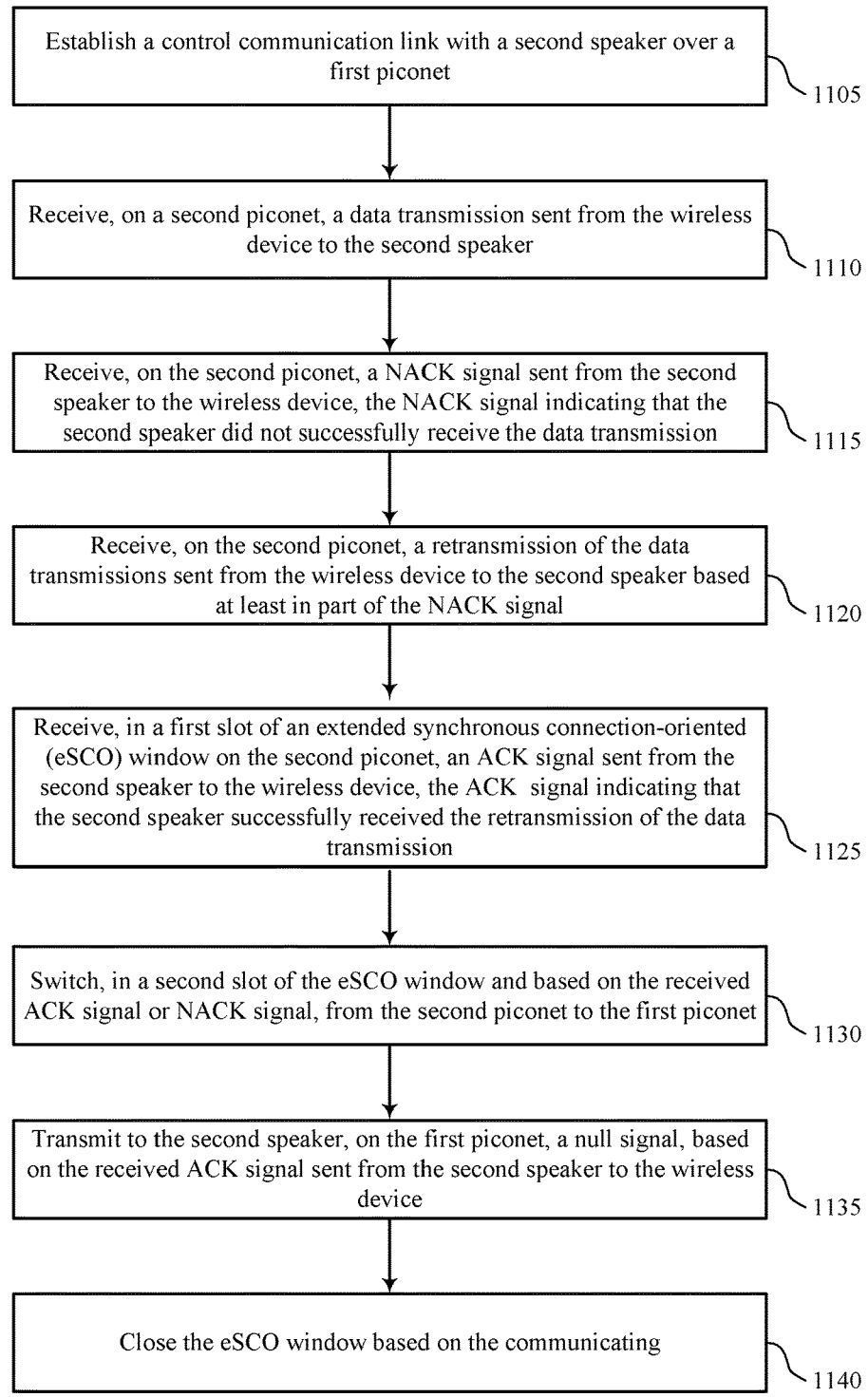

FIG. 11 shows a flowchart illustrating a method 1100 that supports power and bandwidth efficient true wireless stereo speakers in accordance with aspects of the present disclosure. The operations of method 1100 may be implemented by a device or its components as described herein. For example, the operations of method 1100 may be performed by a communications manager as described with reference to FIGS. 7 through 8. In some examples, a device may execute a set of instructions to control the functional elements of the device to perform the functions described below. Additionally, or alternatively, a device may perform aspects of the functions described below using special-purpose hardware.

At 1105, the device may establish a control communication link with a second speaker over a first piconet. The operations of 1105 may be performed according to the methods described herein. In some examples, aspects of the operations of 1105 may be performed by a control communication link manager as described with reference to FIGS. 7 through 8.

At 1110, the device may receive, on the second piconet, a data transmission sent from the wireless device to the second speaker. The operations of 1110 may be performed according to the methods described herein. In some examples, aspects of the operations of 1110 may be performed by a data manager as described with reference to FIGS. 7 through 8.

At 1115, the device may receive, on the second piconet, a NACK signal sent from the second speaker to the wireless device, the NACK signal indicating that the second speaker did not successfully receive the data transmission. The operations of 1115 may be performed according to the methods described herein. In some examples, aspects of the operations of 1115 may be performed by a NACK signal manager as described with reference to FIGS. 7 through 8.

At 1120, the device may receive, on the second piconet, a retransmission of the data transmissions sent from the wireless device to the second speaker based at least in part of the NACK signal. The operations of 1120 may be performed according to the methods described herein. In some examples, aspects of the operations of 1120 may be performed by a data manager as described with reference to FIGS. 7 through 8.

At 1125, the device may receive, in a first slot of an extended synchronous connection-oriented (eSCO) window on the second piconet, an ACK signal sent from the second speaker to the wireless device, the ACK signal indicating that the second speaker successfully received the retransmission of the data transmission. The operations of 1125 may be performed according to the methods described herein. In some examples, aspects of the operations of 1125 may be performed by an eSCO window manager as described with reference to FIGS. 7 through 8.

At 1130, the device may switch, in a second slot of the eSCO window and based on the received ACK signal or NACK signal, from the second piconet to the first piconet. The operations of 1130 may be performed according to the methods described herein. In some examples, aspects of the operations of 1130 may be performed by a piconet switching manager as described with reference to FIGS. 7 through 8.

At 1135, the device may transmit to the second speaker, on the first piconet, a null signal, based on the received ACK signal sent from the second speaker to the wireless device. The operations of 1135 may be performed according to the methods described herein. In some examples, aspects of the operations of 1135 may be performed by a null signal manager as described with reference to FIGS. 7 through 8.

At 1140, the device may close the eSCO window based on the communicating. The operations of 1140 may be performed according to the methods described herein. In some examples, aspects of the operations of 1140 may be performed by an eSCO window manager as described with reference to FIGS. 7 through 8.

Figure 12:
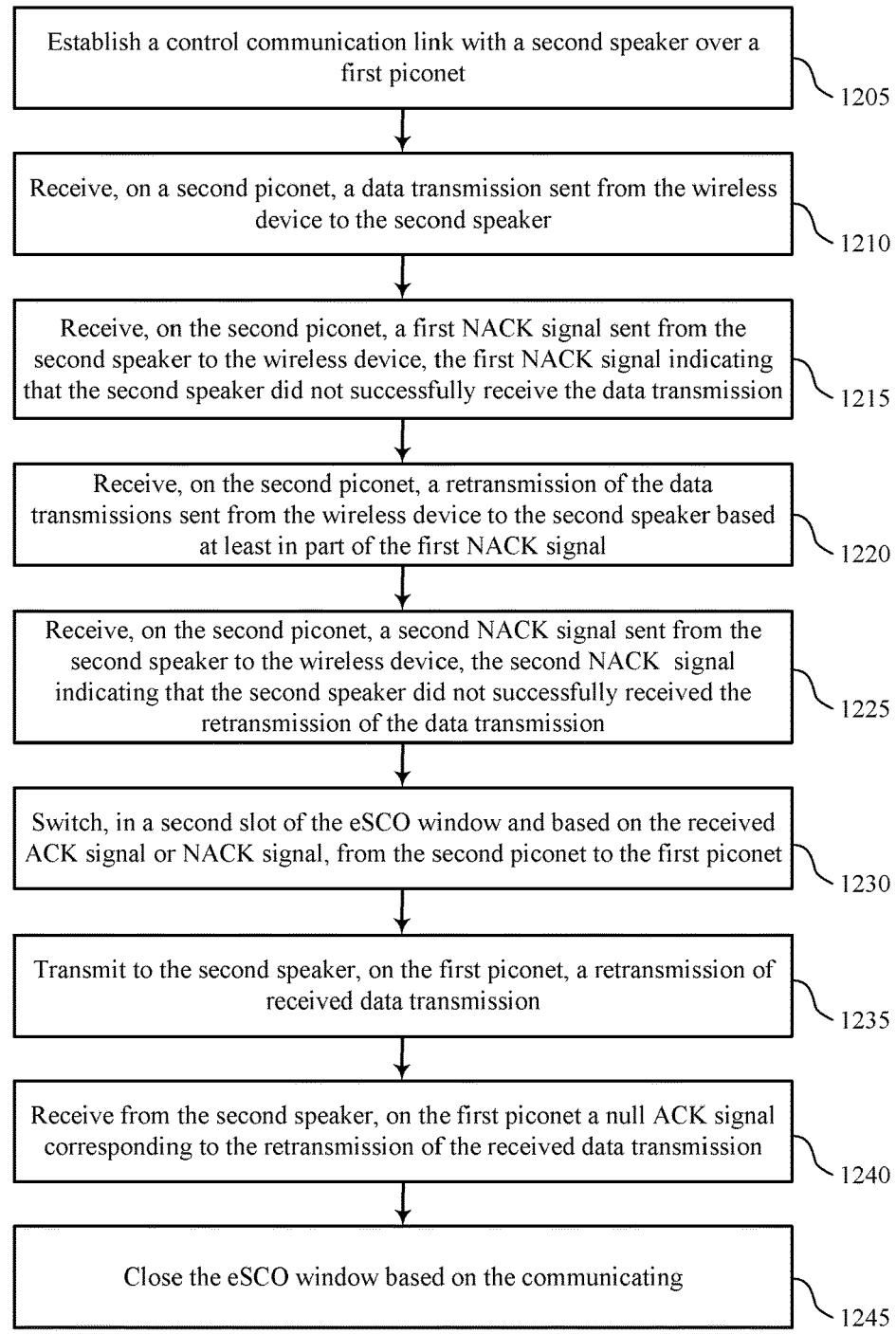

FIG. 12 shows a flowchart illustrating a method 1200 that supports power and bandwidth efficient true wireless stereo speakers in accordance with aspects of the present disclosure. The operations of method 1200 may be implemented by a device or its components as described herein. For example, the operations of method 1200 may be performed by a communications manager as described with reference to FIGS. 7 through 8. In some examples, a device may execute a set of instructions to control the functional elements of the device to perform the functions described below. Additionally, or alternatively, a device may perform aspects of the functions described below using special-purpose hardware.

At 1205, the device may establish a control communication link with a second speaker over a first piconet. The operations of 1205 may be performed according to the methods described herein. In some examples, aspects of the operations of 1205 may be performed by a control communication link manager as described with reference to FIGS. 7 through 8.

At 1210, the device may receive, on the second piconet, a data transmission sent from the wireless device to the second speaker. The operations of 1210 may be performed according to the methods described herein. In some examples, aspects of the operations of 1210 may be performed by a data manager as described with reference to FIGS. 7 through 8.

At 1215, the device may receive, on the second piconet, a first NACK signal sent from the second speaker to the wireless device, the first NACK signal indicating that the second speaker did not successfully receive the data transmission. The operations of 1215 may be performed according to the methods described herein. In some examples, aspects of the operations of 1215 may be performed by a NACK signal manager as described with reference to FIGS. 7 through 8.

At 1220, the device may receive, on the second piconet, a retransmission of the data transmissions sent from the wireless device to the second speaker based at least in part of the first NACK signal. The operations of 1220 may be performed according to the methods described herein. In some examples, aspects of the operations of 1220 may be performed by a data manager as described with reference to FIGS. 7 through 8.

At 1225, the device may receive, on the second piconet, a second NACK signal sent from the second speaker to the wireless device, the second NACK signal indicating that the second speaker did not successfully received the retransmission of the data transmission. The operations of 1225 may be performed according to the methods described herein. In some examples, aspects of the operations of 1225 may be performed by an eSCO window manager as described with reference to FIGS. 7 through 8.

At 1230, the device may switch, in a second slot of the eSCO window and based on the received ACK signal or NACK signal, from the second piconet to the first piconet. The operations of 1230 may be performed according to the methods described herein. In some examples, aspects of the operations of 1230 may be performed by a piconet switching manager as described with reference to FIGS. 7 through 8.

At 1235, the device may transmit to the second speaker, on the first piconet, a retransmission of received data transmission. The operations of 1235 may be performed according to the methods described herein. In some examples, aspects of the operations of 1235 may be performed by a data manager as described with reference to FIGS. 7 through 8.

At 1240, the device may receive from the second speaker, on the first piconet a null ACK signal corresponding to the retransmission of the received data transmission. The operations of 1240 may be performed according to the methods described herein. In some examples, aspects of the operations of 1240 may be performed by a null signal manager' as described with reference to FIGS. 7 through 8.

At 1245, the device may close the eSCO window based on the communicating. The operations of 1245 may be performed according to the methods described herein. In some examples, aspects of the operations of 1245 may be performed by an eSCO window manager as described with reference to FIGS. 7 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first speaker, comprising:
    establishing a control communication link with a second speaker over a first piconet;
    receiving, in a first slot of an extended synchronous connection-oriented (eSCO) window on a second piconet, a first null signal sent from a wireless device to the second speaker;
    switching, in a second slot of the eSCO window that is consecutive to the first slot, and based at least in part on the first null signal, from the second piconet to the first piconet;
    transmitting to the second speaker, on the first piconet, a second null signal based at least in part on the first null signal; and
    closing the eSCO window based at least in part on the second null signal.

2. The method of claim 1, further comprising:
    receiving, on the second piconet, a data transmission sent from the wireless device to the second speaker;
    receiving, on the second piconet, an acknowledgement (ACK) signal sent from the second speaker to the wireless device, the ACK signal corresponding to the received data transmission; and
    receiving, on the second piconet, the first null signal sent from the wireless device to the second speaker, wherein the first null signal is a null ACK signal that is based at least in part on the received ACK signal.

3. The method of claim 2, wherein transmitting the second null signal further comprises:
    transmitting to the second speaker, on the first piconet, the second null signal in the second slot based at least in part on the received data transmission sent from the wireless device to the second speaker and the received ACK signal sent from the second speaker to the wireless device.

4. The method of claim 1, further comprising:
    failing to receive, on the second piconet, a data transmission sent from the wireless device to the second speaker;
    receiving, on the second piconet, an acknowledgement (ACK) signal sent from the second speaker to the wireless device based at least in part on the received data transmission; and
    receiving, on the second piconet, the first null signal sent from the wireless device to the second speaker, wherein the first null signal is a null ACK signal corresponding to the received ACK signal.

5. The method of claim 4, wherein transmitting the second null signal further comprises:
    transmitting to the second speaker, on the first piconet, a poll signal requesting the data transmission sent from the wireless device to the second speaker;
    receiving from the second speaker, on the first piconet and based at least in part on the poll signal, the data transmission; and
    transmitting to the second speaker, on the first piconet and based at least in part on receiving the data transmission, the second null signal, wherein the null signal is a null ACK signal corresponding to the received data transmission.

6. The method of claim 1, wherein the first slot is a first slot of a first Bluetooth slot pair corresponding to the second piconet, and the second slot is a first slot of a second Bluetooth slot pair corresponding to the first piconet.

7. The method of claim 1, further comprising:
determining, based at least in part on receiving the first null signal, that the wireless device will not send more transmissions to the second speaker for the duration of the eSCO window; and
switching to the first piconet based at least in part on the determining.

8. The method of claim 1, wherein establishing the control communication link further comprises:
receiving, from the second speaker, information about the second piconet information.

9. The method of claim 8, further comprising:
performing sniffing procedures to detect signaling between the wireless device and the second speaker on the second piconet based at least in part on the received information about the second piconet.

10. The method of claim 1, wherein the first speaker is a master device and the second speaker is a slave device with respect to the first piconet, and wherein the wireless device is a master device and the second speaker is a slave device with respect to the second piconet.

11. A method for wireless communication at a first speaker, comprising:
establishing a control communication link with a second speaker over a first piconet;
receiving, in a first slot of an extended synchronous connection-oriented (eSCO) window on a second piconet, an acknowledgment (ACK) signal or a negative acknowledgement (NACK) signal sent from the second speaker to the wireless device;
switching, in a second slot of the eSCO window and based at least in part on the received ACK signal or NACK signal, from the second piconet to the first piconet;
communicating with the second speaker on the first piconet based at least in part on the received ACK signal or NACK signal; and
closing the eSCO window based at least in part on the communicating.

12. The method of claim 11, further comprising:
receiving, on the second piconet, a data transmission sent from the wireless device to the second speaker;
receiving, on the second piconet, a NACK signal sent from the second speaker to the wireless device, the NACK signal indicating that the second speaker did not successfully receive the data transmission;
receiving, on the second piconet, a retransmission of the data transmissions sent from the wireless device to the second speaker based at least in part of the NACK signal; and
receiving, on the second piconet, an ACK signal sent from the second speaker to the wireless device, the ACK signal indicating that the second speaker successfully received the retransmission of the data transmission.

13. The method of claim 12, wherein communicating with the second speaker on the first piconet further comprises:
transmitting to the second speaker, on the first piconet, a null signal, based at least in part on the received ACK signal sent from the second speaker to the wireless device.

14. The method of claim 11, further comprising:
receiving, on the second piconet, a data transmission sent from the wireless device to the second speaker;
receiving, on the second piconet, a first NACK signal sent from the second speaker to the wireless device, the first NACK signal indicating that the second speaker did not successfully receive the data transmission;
receiving, on the second piconet, a retransmission of the data transmissions sent from the wireless device to the second speaker based at least in part of the first NACK signal; and
receiving, on the second piconet, a second NACK signal sent from the second speaker to the wireless device, the second NACK signal indicating that the second speaker did not successfully received the retransmission of the data transmission.

15. The method of claim 14, wherein communicating with the second speaker on the first piconet further comprises:
transmitting to the second speaker, on the first piconet, a retransmission of received data transmission; and
receiving from the second speaker, on the first piconet a null ACK signal corresponding to the retransmission of the received data transmission.

16. The method of claim 11, wherein the first slot is a last slot in a retransmission window of the eSCO window, and the second slot is a first slot in a cooperation window of the eSCO window.

17. The method of claim 11, further comprising:
determining, based at least in part on receiving the ACK signal or NACK signal, that the wireless device will not send more transmissions to the second speaker for the duration of the eSCO window; and
switching to the first piconet based at least in part on the determining.

18. The method of claim 11, wherein establishing the control communication link further comprises:
receiving, from the second speaker, information about the second piconet.

19. The method of claim 18, further comprising:
performing sniffing procedures to detect signaling between the wireless device and the second speaker on the second piconet based at least in part on the received information about the second piconet.

20. An apparatus for wireless communication at a first speaker, comprising:
a processor,
memory in electronic communication with the processor; and
instructions stored in the memory and executable by the processor to cause the apparatus to:
establish a control communication link with a second speaker over a first piconet;
receive, in a first slot of an extended synchronous connection-oriented (eSCO) window on a second piconet, a first null signal sent from a wireless device to the second speaker;
switch, in a second slot of the eSCO window that is consecutive to the first slot, and based at least in part on the first null signal, from the second piconet to the first piconet;
transmit to the second speaker, on the first piconet, a second null signal based at least in part on the first null signal; and
close the eSCO window based at least in part on the second null signal.

* * * * *